(12) United States Patent
Sato

(10) Patent No.: US 7,447,724 B2
(45) Date of Patent: Nov. 4, 2008

(54) ERROR FUNCTION CALCULATION DEVICE AND ERROR FUNCTION CALCULATION METHOD

(75) Inventor: Hisao Sato, Suwa (JP)

(73) Assignee: Seiko Epson Corporation (JP)

( * ) Notice: Subject to any disclaimer, the term of this patent is extended or adjusted under 35 U.S.C. 154(b) by 752 days.

(21) Appl. No.: 10/999,293

(22) Filed: Nov. 29, 2004

(65) Prior Publication Data

US 2005/0120068 A1      Jun. 2, 2005

(30) Foreign Application Priority Data

Nov. 27, 2003    (JP) ............... 2003-397662

(51) Int. Cl.
    *G06F 17/11*    (2006.01)
(52) U.S. Cl. .................................. 708/446
(58) Field of Classification Search ........... 708/446
    See application file for complete search history.

(56) References Cited

U.S. PATENT DOCUMENTS

2004/0267851 A1 * 12/2004 Singhal ............... 708/490

FOREIGN PATENT DOCUMENTS

| JP | 10-055343 | 2/1998 |
| JP | 2000-099493 | 4/2000 |
| JP | 2000-293494 | 10/2000 |

OTHER PUBLICATIONS

H. Takashima, T. Amisaki, S. Yamaga, et al. "Computing Methods for the Auxiliary s-type Integrals $[O]^{(m)}$ by a Molecular Orbital Special-Purpose Machine MOEngine" JCPE Journal, vol. 13, No. 4, p. 241-250 (2001).

S. Obara and A. Saika, "Efficient recursive computation of molecular integrals over Cartesian Gaussian functions" J. Chem. Phys. 84 (7), Apr. 1, 1986.

S. Obara and A. Saika, "General recurrance formulas for molecular integrals over Cartesian Gaussian functions" J. Chem. Phy. 89 (3), Aug. 1, 1988.

* cited by examiner

Primary Examiner—David H Malzahn
(74) Attorney, Agent, or Firm—Harness, Dickey & Pierce, P.L.C.

(57) ABSTRACT

An error function calculation device, which performs processing of calculating an error function $F_M(T)$ having T (positive real number) as a variable and M (M is an integer of 0 or more) as an order, includes a coefficient table and a calculation section. The coefficient table stores a value of $F_{M+i}(T_0)/F_M(T_0)$ (i is at least one integer among 1 to n, and n is a natural number) calculated for $T_0$, obtained by an n-th order polynomial approximation of the error function $F_M(T)$, or a multiplied value which is obtained by multiplying the value of $F_{M+i}(T_0)/F_M(T_0)$ by a constant. The calculation section reads the value of $F_{M+i}(T_0)/F_M(T_0)$ or the multiplied value from the coefficient table, and performs at least a part of the processing of calculating a value of the error function $F_M(T)$ by a fixed-point arithmetic using the value of $F_{M+i}(T_0)/F_M(T_0)$ or the multiplied value.

9 Claims, 13 Drawing Sheets

FIG. 2

| VARIABLE T | STEP | NUMBER OF ENTRIES | CAPACITY (BYTE) |
|---|---|---|---|
| $0 \leq T \leq 22$ | 1/1024 STEPS | 22×1024=22,528 | 3,244,032 |
| $22 < T \leq 45$ | 1/512 STEPS | 23×512=11,776 | 1,695,744 |
| $45 < T \leq 90$ | 1/256 STEPS | 45×256=11,520 | 1,658,880 |
| | | TOTAL 45,824 | 6,598,656 |

$$(-1)^S \times (1 + \text{MANTISSA}) \times 2^{\text{EXPONENT}}$$

FIG. 13

```
for (I=0;I<Nshell;I++)
  for (J=0; J<I; J++)
    for (K=0; K<J; K++)
      for (L=0; L<K; L++)
        for (i=0; i<N_i; i++)
          for (j=0; j<N_j; j++)
            for (k=0; k<N_k; k++)
              for (l=0; l<N_l; l++)
                  CALCULATION OF
                  <s_i, s_j, s_k, s_l>
              forend
            forend
          forend
        forend
        CALCULATION OF
        <a_I, b_J, c_K, d_L>
      forend
    forend
  forend
forend
```

} INITIAL INTEGRAL CALCULATION SECTION

------ RECURRENCE CALCULATION SECTION

US 7,447,724 B2

ERROR FUNCTION CALCULATION DEVICE AND ERROR FUNCTION CALCULATION METHOD

Japanese Patent Application No. 2003-397662, filed on Nov. 27, 2003, is hereby incorporated by reference in its entirety.

BACKGROUND OF THE INVENTION

The present invention relates to an error function calculation device and an error function calculation method.

In the field of medicine manufacture, material development, or the like, a molecular level design may be necessary for development of new materials. In this case, the nature of the designed molecule is confirmed by knowing the molecular electronic state. The electronic state is known by calculating the electronic wave function. The molecular electronic state is calculated by using various methods. An ab initio molecular orbital method using ab initio molecular orbital calculations is one of these methods. In the ab initio molecular orbital method, the molecular electronic state is theoretically calculated by starting from a Schrodinger equation without taking experimental data into consideration.

The ab initio molecular orbital method requires an enormous amount of calculation proportional to the fourth power of the size of the molecule to be calculated, even when using the simplest Hartree-Fock method (hereinafter abbreviated as "HF method"). It is difficult to design a molecule with a large size in spite of development of calculators (computers) and progress of parallelization technology in recent years. In the ab initio molecular orbital calculation, a step of calculating a two-electron integral and generating a Fock matrix requires most of the calculation time. Therefore, as a method for processing the calculation in the ab initio molecular orbital method at high speed, various methods for accelerating the two-electron integral calculation have been proposed.

The two-electron integral is determined by four Gaussian-type functions, for example. When the orbital quantum vectors of these Gaussian-type functions are denoted by a, b, c, and d, the sum of the three vector components (x component, y component, and z component) of a certain orbital quantum vector is called an orbital quantum number, and orbitals whose orbital quantum number is 0, 1, 2, . . . are respectively called an s orbital, p orbital, d orbital, . . . . The two-electron integral is expressed as [pp|ss] (or (pp,ss) or (pp|ss)), [dd|ss] (or (dd,ss) or (dd|ss)), or the like using the orbitals indicated by the orbital quantum numbers of the four orbital quantum vectors a, b, c, and d which determine the calculation.

The two-electron integral calculation is divided into calculation of initial integrals $[0]^{(0)}$ to $[0]^{(m)}$ and calculation of two-electron integrals by a recurrence calculation using the initial integrals $[0]^{(0)}$ to $[0]^{(m)}$ and a coefficient. [0] means [ss|ss], and m means the sum of the major orbital quantum numbers of the orbitals of the two-electron integral [ij|kl]. For example, a method for accelerating the calculation of the initial integral $[0]^{(m)}$ is disclosed in "Computing Methods for the Auxiliary s-type Integrals $[0]^{(m)}$ by a Molecular Orbital Special-Purpose Machine MOEngine", H. Takashima and nine others, JCPE Journal, Japan Chemistry Program Exchange, October 2001, Vol. 13, No. 4, pp. 241-250.

The two-electron integral calculation is expressed by a recurrence calculation by applying an Obara algorithm (see "General recurrence formulas for molecular integrals over Cartesian Gaussian function", S. Obara and A. Saika, J. Chem. Phys. Vol 89, No. 3, August 1988, for example). This calculation can be accelerated by calculating a plurality of multiplication-accumulation calculations in parallel. However, since the initial integral calculation section has a small degree of parallelism, this section becomes a bottle neck for acceleration.

Specifically, the Obara algorithm has a program structure in which the two-electron integral value is calculated by repeating processing of performing the recurrence calculation after the initial integral calculation having a quadruple loop structure in the outer quadruple loop, as shown in FIG. 13. In the initial integral calculation having the quadruple loop structure, calculation processing of the exponential function and the error function is performed as described in "Efficient recursive computation of molecular integrals over Cartesian Gaussian functions" (S. Obara and A. Saika, J. Chem. Phys. 84 (7), 1 Apr. 1986) and "Computing Methods for the Auxiliary s-type Integrals $[0]^{(m)}$ by a Molecular Orbital Special-Purpose Machine MOEngine", H. Takashima and nine others, JCPE Journal, Japan Chemistry Program Exchange, October 2001, Vol. 13, No. 4, pp. 241-250. Therefore, the two-electron integral calculation can be accelerated by accelerating the calculation of the exponential function and the error function. In particular, since the calculation of the error function is repeated in the octuple loop, the two-electron integral calculation is easily accelerated by accelerating the calculation of the error function.

It is preferable that the calculation processing of the error function be implemented using a configuration suitable for integration (integration into IC) so that the molecular electronic state can be calculated and the molecular simulation can be performed by using not only a large-scale computer but also a personal computer.

It is necessary to calculate the error function when applying the Gaussian function. Since an arbitrary function can be expressed by overlapping of the Gaussian functions, an error function calculation device which calculates the error function at high speed has a wide application range not only in the field of molecular design but also in other fields.

As described above, it is preferable that the calculation processing of the error function be implemented at low cost using a small configuration.

However, highly accurate calculation processing of the error function must be performed by a floating-point arithmetic as described in "Computing Methods for the Auxiliary s-type Integrals $[0]^{(m)}$ by a Molecular Orbital Special-Purpose Machine MOEngine", H. Takashima and nine others, JCPE Journal, Japan Chemistry Program Exchange, October 2001, Vol. 13, No. 4, pp. 241-250. Therefore, the scale of the circuit which implements the floating-point arithmetic is increased. Moreover, since the reference table must store data in floating-point representation, the capacity of the reference table is increased.

BRIEF SUMMARY OF THE INVENTION

A first aspect of the present invention relates to an error function calculation device which performs processing of calculating an error function $F_M(T)$ having T (positive real number) as a variable and M (M is an integer of 0 or more) as an order, the error function calculation device including:

a coefficient table which stores a value of $F_{M+i}(T_0)/F_M(T_0)$ (i is at least one integer among 1 to n, and n is a natural number) calculated for a predetermined $T_0$, obtained by an n-th order polynomial approximation of the error function $F_M(T)$, or a value obtained by multiplying the value of $F_{M+i}(T_0)/F_M(T_0)$ by a constant; and a calculation section which reads the value of $F_{M+i}(T_0)/F_M(T_0)$ or the value obtained by multiplying the value of $F_{M+i}$ ($T_0$)/$F_M$($T_0$) by a constant from the coefficient table, and performs at least a part of the processing of calculating a value of the error function $F_M(T)$ by a fixed-point arithmetic using the value of $F_{M+i}(T_0)/F_M(T_0)$ or the value obtained by multiplying the value of $F_{M+i}(T_0)/F_M(T_0)$ by a constant.

A second aspect of the present invention relates to an error function calculation method for performing processing of calculating an error function $F_M(T)$ which is defined by the following equation (4) when a variable is T (positive real number) and an order is M (M is an integer of 0 or more), the error function calculation method including:

providing a coefficient table which stores a value of $F_{M+i}(T_0)/F_M(T_0)$ (i is at least one integer among 1 to n, and n is a natural number) calculated for a predetermined $T_0$, obtained by an n-th order polynomial approximation of the error function $F_M(T)$, or a value obtained by multiplying the value of $F_{M+i}(T_0)/F_M(T_0)$ by a constant; and causing a calculation section to read the value of $F_{M+i}(T_0)/F_M(T_0)$ or the value obtained by multiplying the value of $F_{M+i}(T_0)/F_M(T_0)$ by a constant from the coefficient table, and to perform processing of calculating at least a part of a following equation (5) by a fixed-point arithmetic.

$$F_M(T) = \int_0^1 t^{2M} \exp(-Tt^2) dt \qquad (4)$$

$$F_M(T) = CF_M(T_0)\left\{1 + (-\varepsilon)\left\{\frac{F_{M+1}(T_0)}{F_M(T_0)} + (-\varepsilon)\left\{\frac{1}{2}\frac{F_{M+2}(T_0)}{F_M(T_0)} + (-\varepsilon)\frac{1}{6}\frac{F_{M+3}(T_0)}{F_M(T_0)} + \ldots\right\}\right\}\right\} \qquad (5)$$

A third aspect of the present invention relates to an error function calculation method for performing processing of calculating an error function $F_M(T)$ which is defined by a following equation (6) when a variable is T (positive real number) and an order is M (M is an integer of 0 or more), the error function calculation method including:

providing an external memory which stores a value of $F_L(T_0)$ (L is an integer from 0 to M) calculated for a predetermined $T_0$, obtained by an n-th order (n is a natural number) polynomial approximation of the error function $F_M(T)$, or a value obtained by multiplying the value of $F_L(T_0)$ by a constant, and a value of $F_{L+i}(T_0)/F_L(T_0)$ (i is an integer from 1 to n) or a value obtained by multiplying the value of $F_{L+i}(T_0)/F_L(T_0)$ by a constant;

reading a value of $FN(T_0)$ (N is an integer from 0 to M) or a value obtained by multiplying the value of $F_N(T_0)$ by a constant and a value of $F_{N+i}(T_0)/F_N(T_0)$ or a value obtained by multiplying the value of $F_{N+i}(T_0)/F_N(T_0)$ by a constant stored in the external memory, and writing the value of $F_{N+i}(T_0)/F_N(T_0)$ or the value obtained by multiplying the value of $F_{N+i}(T_0)/F_N(T_0)$ by a constant into a coefficient table; and causing a calculation section to perform processing of calculating at least a part of a following equation (7) by a fixed-point arithmetic using the value of $F_{N+i}(T_0)/F_N(T_0)$ or the value obtained by multiplying the value of $F_{N+i}(T_0)/F_N(T_0)$ by a constant written into the coefficient table.

$$F_M(T) = \int_0^1 t^{2M} \exp(-Tt^2) dt \qquad (6)$$

$$F_M(T) = CF_M(T_0)\left\{1 + (-\varepsilon)\left\{\frac{F_{M+1}(T_0)}{F_M(T_0)} + (-\varepsilon)\left\{\frac{1}{2}\frac{F_{M+2}(T_0)}{F_M(T_0)} + (-\varepsilon)\frac{1}{6}\frac{F_{M+3}(T_0)}{F_M(T_0)} + \ldots\right\}\right\}\right\} \qquad (7)$$

A fourth aspect of the present invention relates to an error function calculation method for performing processing of calculating an error function $F_M(T)$ which is defined by a following equation (8) when a variable is T (positive real number) and an order is M (M is an integer of 0 or more), the error function calculation method including:

providing a coefficient table which stores a value of $F_{M+n}(T_0)$ (n is a natural number) calculated for a predetermined $T_0$, obtained by an n-th order polynomial approximation of the error function $F_M(T)$; and causing a calculation section to perform processing of calculating at least a part of a following equation (9) by a fixed-point arithmetic using values of $F_{M+n-1}(T_0), \ldots,$ and $F_M(T_0)$ calculated by a following equation (10) and the value of $F_{M+n}(T_0)$ from the coefficient table.

$$F_M(T) = \int_0^1 t^{2M} \exp(-Tt^2) dt \qquad (8)$$

$$F_M(T) = CF_M(T_0)\left\{1 + (-\varepsilon)\left\{\frac{F_{M+1}(T_0)}{F_M(T_0)} + (-\varepsilon)\left\{\frac{1}{2}\frac{F_{M+2}(T_0)}{F_M(T_0)} + (-\varepsilon)\frac{1}{6}\frac{F_{M+3}(T_0)}{F_M(T_0)} + \ldots\right\}\right\}\right\} \qquad (9)$$

$$F_{M-1}(T) = \frac{1}{2M-1}\{\exp(-T) + 2TF_M(T)\} \qquad (10)$$

BRIEF DESCRIPTION OF THE SEVERAL VIEWS OF THE DRAWING

FIG. 2 is illustrative of a calculation example of the capacity of the coefficient table implemented by using a calculation method in the comparative example.

FIG. 13 is illustrative of an Obara algorithm.

DETAILED DESCRIPTION OF THE EMBODIMENT

Figure 1:
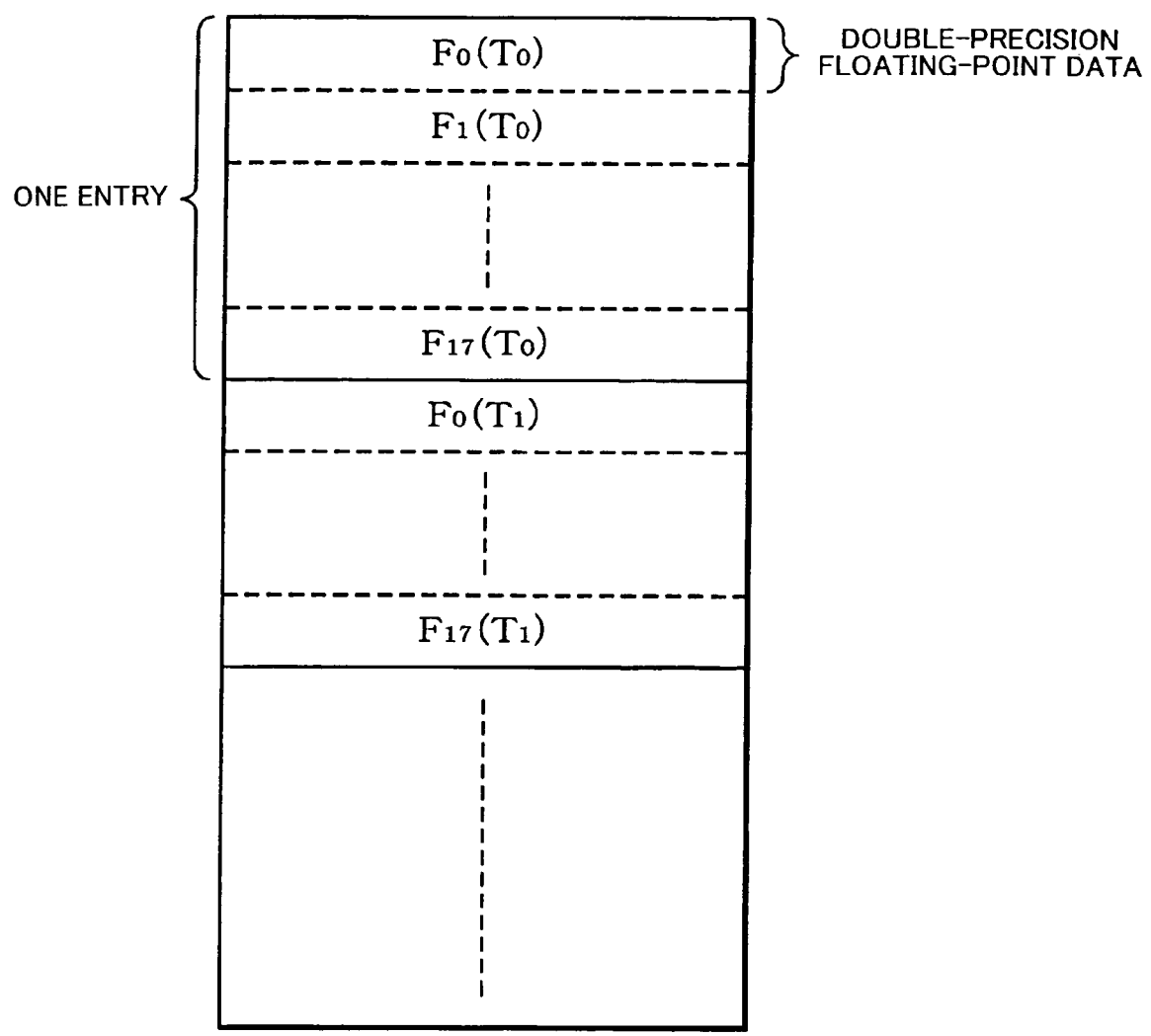
FIG. 1 is a schematic diagram of a coefficient table in a comparative example.

The present invention has been achieved in view of the above-described technical problems, and can provide an error function calculation device and an error function calculation method which can accelerate the error function calculation at low cost using a configuration suitable for integration.

One embodiment of the present invention provides an error function calculation device which performs processing of calculating an error function $F_M(T)$ having T (positive real number) as a variable and M (M is an integer of 0 or more) as an order, the error function calculation device including:

a coefficient table which stores a value of $F_{M+i}(T_0)/F_M(T_0)$ (i is at least one integer among 1 to n, and n is a natural number) calculated for a predetermined $T_0$, obtained by an n-th order polynomial approximation of the error function $F_M(T)$, or a value obtained by multiplying the value of $F_{M+i}(T_0)/F_M(T_0)$ by a constant; and a calculation section which reads the value of $F_{M+i}(T_0)/F_M(T_0)$ or the value obtained by multiplying the value of $F_{M+i}(T_0)/F_M(T_0)$ by a constant from the coefficient table, and performs at least a part of the processing of calculating a value of the error function $F_M(T)$ by a fixed-point arithmetic using the value of $F_{M+i}(T_0)/F_M(T_0)$ or the value obtained by multiplying the value of $F_{M+i}(T_0)/F_M(T_0)$ by a constant.

With this error function calculation device, the error function $F_M(T)$ may be defined by the following equation (1), and the calculation section may perform processing of calculating at least a part of the following equation (2) by a fixed-point arithmetic.

$$F_M(T) = \int_0^1 t^{2M} \exp(-Tt^2) dt \qquad (1)$$

$$F_M(T) = CF_M(T_0)\left\{1 + (-\varepsilon)\left\{\frac{F_{M+1}(T_0)}{F_M(T_0)} + (-\varepsilon)\left\{\frac{1}{2}\frac{F_{M+2}(T_0)}{F_M(T_0)} + (-\varepsilon)\frac{1}{6}\frac{F_{M+3}(T_0)}{F_M(T_0)} + \ldots\right\}\right\}\right\} \qquad (2)$$

With this error function calculation device, the value of $F_{M+i}(T_0)/F_M(T_0)$ or the value obtained by multiplying the value of $F_{M+i}(T_0)/F_M(T_0)$ by a constant may be a fixed-point value.

The value of $F_{M+i}(T_0)/F_M(T_0)$ or the value obtained by multiplying the value of $F_{M+i}(T_0)/F_M(T_0)$ by a constant is stored in the coefficient table. The value of $F_{M+i}(T_0)/F_M(T_0)$ or the value obtained by multiplying the value of $F_{M+i}(T_0)/F_M(T_0)$ by a constant can be fixed-point data, and the configuration of the error function calculation device can be simplified by performing at least a part of the processing of calculating the value of the error function by a fixed-point arithmetic in comparison with the case of implementing a floating-point arithmetic.

In particular, the value of $F_{M+i}(T_0)/F_M(T_0)$ or the value obtained by multiplying the value of $F_{M+i}(T_0)/F_M(T_0)$ by a constant stored in the coefficient table can necessarily be fixed-point data by using the nature of the error function defined by the equation (1), whereby a reduction of the capacity of the coefficient table can be realized. As a result, an error function calculation device which performs processing of calculating the error function using a configuration suitable for integration without decreasing the accuracy of the value of the error function to be calculated can be provided.

Moreover, an error function calculation device which can be applied to the Obara algorithm can be realized by using the error function defined by the equation (1).

With this error function calculation device, the coefficient table may store a value of $F_M(T_0)$ or a value obtained by multiplying the value of $F_M(T_0)$ by a constant, and the calculation section may perform the processing of calculating the value of the error function $F_M(T)$ based on a calculation result of a fixed-point arithmetic using the value of $F_{M+i}(T_0)/F_M(T_0)$ or the value obtained by multiplying the value of $F_{M+i}(T_0)/F_M(T_0)$ by a constant read from the coefficient table and the value of $F_M(T_0)$ or the value obtained by multiplying the value of $F_M(T_0)$ by a constant.

Since the processing of calculating the error function can be performed without performing a floating-point arithmetic, the configuration of the error function calculation device can be reduced in size, whereby cost can be reduced.

With this error function calculation device, the coefficient table may be formed by a memory, storage content of which is rewritten.

This error function calculation device may include a transfer control section which transfers data stored in an external memory to the coefficient table, the external memory may store a value of $F_L(T_0)$ (L is an integer from 0 to M) or a value obtained by multiplying the value of $F_L(T_0)$ by a constant and a value of $F_{L+i}(T_0)/F_L(T_0)$ (i is an integer from 1 to n) or a value obtained by multiplying the value of $F_{L+i}(T_0)/F_L(T_0)$ by a constant, the transfer control section may read a value of $F_N(T_0)$ (N is an integer from 0 to M) or a value obtained by multiplying the value of $F_N(T_0)$ by a constant and a value of $F_{N+i}(T_0)/F_N(T_0)$ or a value obtained by multiplying the value of $F_{N+i}(T_0)/F_{N(T0)}$ by a constant, and may write the value of $F_{N+i}(T_0)/F_N(T_0)$ or the value obtained by multiplying the value of $F_{N+i}(T_0)/F_N(T_0)$ by a constant into the coefficient table, the value of $F_N(T_0)$ or the value obtained by multiplying the value of $F_N(T_0)$ by a constant and the value of $F_{N+i}(T_0)/F_N(T_0)$ or the value obtained by multiplying the value of $F_{N+i}(T_0)/F_N(T_0)$ by a constant being stored in the external memory, and the calculation section may perform at least a part of the processing of calculating the value of the error function $F_M(T)$ by a fixed-point arithmetic using the value of $F_{N+i}(T_0)/F_N(T_0)$ or the value obtained by multiplying the value of $F_{N+i}(T_0)/F_N(T_0)$ by a constant, the value of $F_{N+i}(T_0)/F_N(T_0)$ or the value obtained by multiplying the value of $F_{N+i}(T_0)/F_N(T_0)$ by a constant being written into the coefficient table.

According to this error function calculation device, the capacity of the coefficient table can be reduced, whereby an error function calculation device which can perform the processing of calculating the error function at high speed can be provided at low cost.

With this error function calculation device, the coefficient table may store a value of $F_{M+n}(T_0)$ calculated for a predetermined $T_0$, and the calculation section may read the value of $F_{M+n}(T_0)$ from the coefficient table, and may perform at least a part of the processing of calculating the value of the error function $F_M(T)$ by a fixed-point arithmetic using values of $F_{M+n-1}(T_0), \ldots$, and $F_M(T_0)$ calculated by the following equation (3) and the value of $F_{M+n}(T_0)$ from the coefficient table.

$$F_{M-1}(T) = \frac{1}{2M-1}\{\exp(-T) + 2TF_M(T)\} \qquad (3)$$

According to this error function calculation device, the capacity of the coefficient table can be minimized, whereby a more inexpensive error function calculation device can be provided.

This error function calculation device may include a decoder which generates an index for reading the value stored in the coefficient table, and the decoder may generate the index based on an exponent part of the variable T in floating-point representation and a higher-order bit of a mantissa part of the variable T.

According to this error function calculation device, the coefficient table can be accessed without performing a floating-point arithmetic even if the variable in double-precision floating-point representation is input, whereby a more inexpensive error function calculation device can be provided. Moreover, the coefficient table can be accessed using a simple configuration when reducing the step width of the variable value for generating the index as the variable value is smaller.

With this error function calculation device, the polynomial approximation may be a Taylor approximation.

Another embodiment of the present invention provides an error function calculation method for performing processing of calculating an error function $F_M(T)$ which is defined by the following equation (4) when a variable is T (positive real number) and an order is M (M is an integer of 0 or more), the error function calculation method including:

providing a coefficient table which stores a value of $F_{M+i}(T_0)/F_M(T_0)$ (i is at least one integer among 1 to n, and n is a natural number) calculated for a predetermined $T_0$, obtained by an n-th order polynomial approximation of the error function $F_M(T)$, or a value obtained by multiplying the value of $F_{M+i}(T_0)/F_M(T_0)$ by a constant; and causing a calculation section to read the value of $F_{M+i}(T_0)/F_M(T_0)$ or the value obtained by multiplying the value of $F_{M+i}(T_0)/F_M(T_0)$ by a constant from the coefficient table, and to perform processing of calculating at least a part of a following equation (5) by a fixed-point arithmetic.

$$F_M(T) = \int_0^1 t^{2M} \exp(-Tt^2)dt \quad (4)$$

$$F_M(T) = CF_M(T_0)\left\{1 + (-\varepsilon)\left\{\frac{F_{M+1}(T_0)}{F_M(T_0)} + (-\varepsilon)\left\{\frac{1}{2}\frac{F_{M+2}(T_0)}{F_M(T_0)} + (-\varepsilon)\frac{1}{6}\frac{F_{M+3}(T_0)}{F_M(T_0)} + \ldots\right\}\right\}\right\} \quad (5)$$

A further embodiment of the present invention provides an error function calculation method for performing processing of calculating an error function $F_M(T)$ which is defined by a following equation (6) when a variable is T (positive real number) and an order is M (M is an integer of 0 or more), the error function calculation method including:

providing an external memory which stores a value of $F_L(T_0)$ (L is an integer from 0 to M) calculated for a predetermined $T_0$, obtained by an n-th order (n is a natural number) polynomial approximation of the error function $F_M(T)$, or a value obtained by multiplying the value of $F_L(T_0)$ by a constant, and a value of $F_{L+i}(T_0)/F_L(T_0)$ (i is an integer from 1 to n) or a value obtained by multiplying the value of $F_{L+i}(T_0)/F_L(T_0)$ by a constant;

reading a value of $F_N(T_0)$ (N is an integer from 0 to M) or a value obtained by multiplying the value of $F_N(T_0)$ by a constant and a value of $F_{N+i}(T_0)/F_N(T_0)$ or a value obtained by multiplying the value of $F_{N+i}(T_0)/F_N(T_0)$ by a constant stored in the external memory, and writing the value of $F_{N+i}(T_0)/F_N(T_0)$ or the value obtained by multiplying the value of $F_{N+i}(T_0)/F_N(T_0)$ by a constant into a coefficient table; and causing a calculation section to perform processing of calculating at least a part of a following equation (7) by a fixed-point arithmetic using the value of $F_{N+i}(T_0)/F_N(T_0)$ or the value obtained by multiplying the value of $F_{N+i}(T_0)/F_N(T_0)$ by a constant written into the coefficient table.

$$F_M(T) = \int_0^1 t^{2M} \exp(-Tt^2)dt \quad (6)$$

$$F_M(T) = CF_M(T_0)\left\{1 + (-\varepsilon)\left\{\frac{F_{M+1}(T_0)}{F_M(T_0)} + (-\varepsilon)\left\{\frac{1}{2}\frac{F_{M+2}(T_0)}{F_M(T_0)} + (-\varepsilon)\frac{1}{6}\frac{F_{M+3}(T_0)}{F_M(T_0)} + \ldots\right\}\right\}\right\} \quad (7)$$

A still further embodiment of the present invention provides an error function calculation method for performing processing of calculating an error function $F_M(T)$ which is defined by a following equation (8) when a variable is T (positive real number) and an order is M (M is an integer of 0 or more), the error function calculation method including:

providing a coefficient table which stores a value of $F_{M+n}(T_0)$ (n is a natural number) calculated for a predetermined $T_0$, obtained by an n-th order polynomial approximation of the error function $F_M(T)$; and causing a calculation section to perform processing of calculating at least a part of a following equation (9) by a fixed-point arithmetic using values of $F_{M+n-1}(T_0), \ldots$, and $F_M(T_0)$ calculated by a following equation (10) and the value of $F_{M+n}(T_0)$ from the coefficient table.

$$F_M(T) = \int_0^1 t^{2M} \exp(-Tt^2)dt \quad (8)$$

$$F_M(T) = CF_M(T_0)\left\{1 + (-\varepsilon)\left\{\frac{F_{M+1}(T_0)}{F_M(T_0)} + (-\varepsilon)\left\{\frac{1}{2}\frac{F_{M+2}(T_0)}{F_M(T_0)} + (-\varepsilon)\frac{1}{6}\frac{F_{M+3}(T_0)}{F_M(T_0)} + \ldots\right\}\right\}\right\} \quad (9)$$

$$F_{M-1}(T) = \frac{1}{2M-1}\{\exp(-T) + 2TF_M(T)\} \quad (10)$$

The embodiments of the present invention are described below in detail with reference to the drawings. Note that the embodiments described hereunder do not in any way limit the scope of the invention defined by the claims laid out herein. Note also that not all of the elements of these embodiments should be taken as essential requirements to the means of the present invention.

The following description illustrates the error function used for the two-electron integral calculation. However, the present invention is not limited to the two-electron integral calculation.

1. Error Function

As a solution of the ab initio molecular orbital method, a method using the HF method has been known. In the calculation of the ab initio molecular orbital method using the HF method, it is known that a step of calculating a two-electron integral and generating a Fock matrix accounts for 95% to 99% of the calculation time. Since the two-electron integral calculation requires the amount of calculation proportional to the fourth power of the number of basis functions, the percentage of the calculation time tends to be increased as the number of basis functions is increased (the size of the system is increased or high-accuracy basis functions are used). Therefore, in order to accelerate the molecular orbital calculation using the ab initio molecular orbital method, it is important to accelerate the two-electron integral calculation.

As an algorithm which accelerates the two-electron integral calculation, the Obara algorithm has been known (see "Efficient recursive computation of molecular integrals over Cartesian Gaussian functions" (S. Obara and A. Saika, J. Chem. Phys. 84 (7), 1 Apr. 1986), for example). The Obara algorithm calculates initial parameters from input data, calculates initial integrals, and calculates the objective two-electron integral by a recurrence calculation using the initial parameters and the initial integrals. Therefore, the Obara algorithm is divided into the initial integral calculation section and the recurrence calculation section, as shown in FIG. 13. Therefore, the two-electron integral calculation is accelerated by accelerating the initial integral calculation section having a small degree of parallelism.

The initial integral $[0]^{(M)}$ is expressed by the following equation (11).

$$[0]^{(M)} = 2\pi^{\frac{5}{2}} \frac{1}{\alpha+\beta} \frac{1}{\gamma+\delta} \frac{1}{\sqrt{\alpha+\beta+\gamma+\delta}} G_{ABCD} F_M(T) \quad (11)$$

$G_{ABCD}$ and $F_M(T)$ are respectively expressed by the following equations (12) and (13).

$$G_{ABCD} = \exp(-S) \quad (12)$$
$$= \exp\left(-\left\{\frac{\alpha\beta}{\alpha+\beta}(A-B)^2 + \frac{\gamma\delta}{\gamma+\delta}(C-D)^2\right\}\right)$$

$$F_M(T) = \int_0^1 t^{2M} \exp(-Tt^2) dt \quad (13)$$

$\alpha$, $\beta$, $\gamma$, and $\delta$ respectively denote orbital factors of Gaussian functions of i, j, k, l of an two-electron integral [ij|kl], and are positive real numbers. A, B, C, and D are coordinates. $F_M(T)$ is called an error function in the molecular orbital calculation.

$$T = \frac{(\alpha+\beta)(\gamma+\delta)}{\alpha+\beta+\gamma+\delta} \left(\frac{\alpha A + \beta B}{\alpha+\beta} - \frac{\gamma C + \delta D}{\gamma+\delta}\right)^2 \quad (14)$$

The error function $F_M(T)$ has an input variable T (positive real number) expressed by the equation (14) and an order M (integer of 0 or more), which is the sum of the major orbital quantum numbers of the orbitals of the two-electron integral [ij|kl].

The Obara algorithm has a program structure in which the two-electron integral value is calculated by repeating processing of performing a recurrence calculation after an initial integral calculation having a quadruple loop structure in the outer quadruple loop, as shown in FIG. 13. In the initial integral calculation having the quadruple loop structure, the calculation processing of the exponential function and the error function is performed as described in "Efficient recursive computation of molecular integrals over Cartesian Gaussian functions" (S. Obara and A. Saika, J. Chem. Phys. 84 (7), 1 Apr. 1986) and "Computing Methods for the Auxiliary s-type Integrals $[0]^{(m)}$ by a Molecular Orbital Special-Purpose Machine MOEngine", H. Takashima and nine others, JCPE Journal, Japan Chemistry Program Exchange, October 2001, Vol. 13, No. 4, pp. 241-250. Therefore, since the calculation of the error function is repeated in the octuple loop, the two-electron integral calculation is easily accelerated by accelerating the calculation of the error function.

2. Comparative Example

Before describing the error function calculation method performed by the error function calculation device in an embodiment of the present invention, an error function calculation method as a comparative example of this embodiment is described below.

As the calculation method of the error function $F_M(T)$, a method using a Taylor expansion as expressed by the following equation (15) may be employed.

$$F_M(T) = F_M(T_0 + \varepsilon) \quad (15)$$
$$= C\left\{F_M(T_0) + (-\varepsilon)\left\{F_{M+1}(T_0) + \frac{(-\varepsilon)}{2}\left\{F_{M+2}(T_0) + \frac{(-\varepsilon)}{3} F_{M+3}(T_0)\right\}\right\}\right\}$$

The equation (15) shows an example in which C is a constant and the error function $F_M(T)$ is approximated by a third-order Taylor approximation. The values of coefficients $F_M(T_0)$, $F_{M+1}(T_0)$, $F_{M+2}(T_0)$, and $F_{M+3}(T_0)$ in the equation (15) are stored in a coefficient table. The value M is determined depending on the degree of approximation, specifically, by the approximation order. For example, when implementing calculation in which M is 0 to 14, the values of the coefficients $F_0(T_0)$ to $F_{17}(T_0)$ are stored in the coefficient table.

FIG. 1 shows a diagram which schematically shows a coefficient table in the comparative example. The values of coefficients $F_0(T_1)$ to $F_{17}(T_1)$, $F_0(T_2)$ to $F_{17}(T_2)$, . . . are stored in the coefficient table respectively for $T_0$, $T_1$, $T_2$, . . . determined in advance corresponding to the range of the input variable T.

In the calculation of the error function using the equation (15), when the input variable T is given, the input variable T is divided into $T_X$ and a displacement $\varepsilon$ ($T=T_X+\varepsilon$). When $T_X$ (X is 0, 1, 2, . . . ) is given, the coefficients $F_0(T_X)$ to $F_{17}(T_X)$ corresponding to the input variable $T_X$ are read from the coefficient table shown in FIG. 1, and the values of the error functions $F_0(T)$ to $F_{14}(T)$ are calculated by using the displacement $\varepsilon$ according to the equation (15).

However, in order to calculate the value of the error function $F_M(T)$ with high accuracy, the values of the coefficients $F_0(T_1)$ to $F_{17}(T_1)$, $F_0(T_2)$ to $F_{17}(T_2)$, . . . should be values calculated with an accuracy of double-precision floating-point arithmetic. Therefore, the values of the coefficients $F_0(T_1)$ to $F_{17}(T_1)$, $F_0(T_2)$ to $F_{17}(T_2)$, . . . stored in the coefficient table shown in FIG. 1 are double-precision floating-point data, and the displacement $\varepsilon$ is also double-precision floating-point data. A double-precision floating-point arithmetic is performed by using the double-precision floating-point data.

Therefore, an error function calculation device realized by using the calculation method in the comparative example requires a multiplication-accumulation calculator or the like which performs calculation using 64-bit double-precision floating-point data conforming to Institute of Electrical and Electronics Engineers (IEEE) 754, for example, whereby cost is increased in spite of integration. Moreover, the calculation speed is lower than that when using an integer calculator.

FIG. 2 shows an explanatory diagram of a calculation example of the capacity of the coefficient table realized by using the calculation method in the comparative example. The capacity of the coefficient table can be reduced while maintaining accuracy of the value to be calculated by changing the step width of the input variable T in the range as shown in FIG. 2. Since the accuracy must be increased as the value of the input variable T is smaller, it is preferable that the step width be reduced as the value of the input variable T is smaller.

For example, when the value of the of input variable T is 0 to 22, a coefficient group corresponding to $T_X$ of 1/1024 steps is stored in the table as one entry for each of the input variable T of 0 to 1, 1 to 2, . . . , and 21 to 22. 18 coefficients $F_0(T_X)$ to $F_{17}(T_X)$, each of which is double-precision floating-point data, are necessary for each entry. Therefore, 22,528 (=22× 1024) entries are necessary when the value of the input variable T is in the range of $0 \leq T \leq 22$, and the capacity of the coefficient table necessary when the value of the input variable T is in the range of $0 \leq T \leq 22$ is 3,244,032 bytes (=22528×18×8).

Since 11,520 (=45×256) entries are necessary when the value of the input variable T is $45 \leq T \leq 90$, the capacity of the coefficient table necessary when the value of the input variable T is $45 \leq T \leq 90$ is 1,658,880 bytes (=11520×18×8).

In the range in which the input variable T is greater than 90, it is known that the error function $F_M(T)$ can be approximated as expressed by the following equation (16).

$$F_M(T) \approx \int_0^\infty t^{2M} \exp[-Tt^2] dt = \frac{(2M-1)!!}{(2t)^M} \cdot \frac{1}{2}\sqrt{\frac{\pi}{T}} \qquad (16)$$

As described above, the capacity of the coefficient table realized by using the calculation method in the comparative example is 6,598,656 bytes in total (45,824 entries). Therefore, an increase in the capacity of the coefficient table is inevitable in the error function calculation device realized by using the calculation method in the comparative example.

Figure 3:
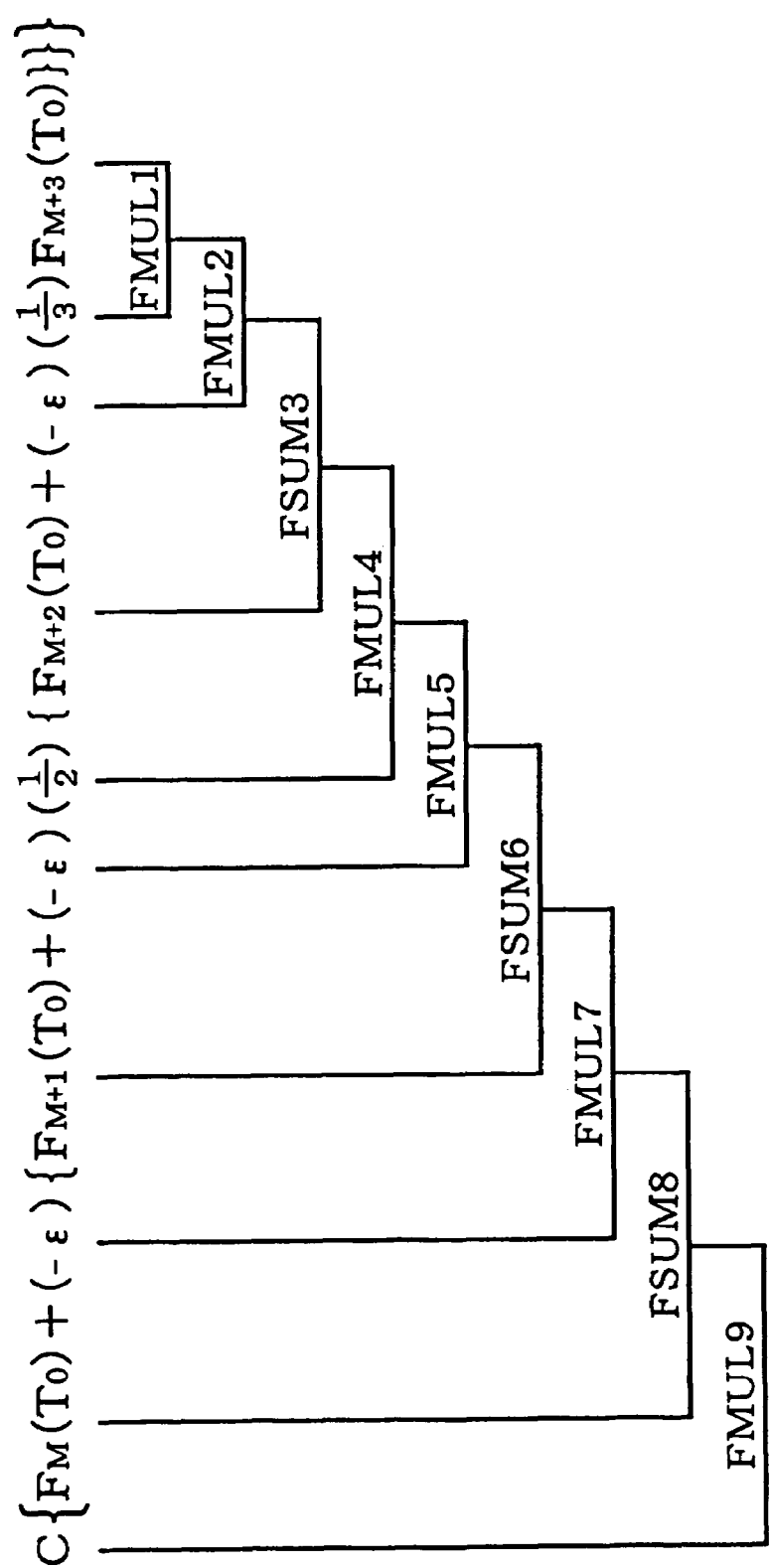
FIG. 3 is illustrative of latency of calculation processing by using the calculation method in the comparative example.

FIG. 3 shows an explanatory diagram of the latency of the calculation processing using the calculation method in the comparative example.

FIG. 3 shows the order of calculation processing of the equation (15). Specifically, the calculation processing of the equation (15) is performed in the order of multiplication (FMUL1)→multiplication (FMUL2)→summation (FSUM3)→multiplication (FMUL4)→multiplication (FMUL5)→summation (FSUM6)→multiplication (FMUL7)→summation (FSUM8)→multiplication (FMUL9). For example, the multiplication (FMUL1) indicates that the product of the coefficient $F_{M+3}(T_0)$ and (⅓) is calculated by a double-precision floating-point arithmetic in FIG. 3, and the summation (FSUM3) indicates that the sum of the result of the multiplication (FMUL2) and the coefficient $F_{M+2}(T_0)$ is calculated by a double-precision floating-point arithmetic in FIG. 3.

As is clear from FIG. 3, since the double-precision floating-point multiplication processing of calculating each product and the double-precision floating-point addition processing of calculating each sum use the preceding calculation result, the processing is started after waiting for the preceding calculation result.

The latency when performing the calculation processing of the equation (15) by using a double-precision floating-point multiplier and a double-precision floating-point adder is considered below. If the latency of the double-precision floating-point multiplication processing is four cycles, the latency of the double-precision floating-point addition processing is four cycles, and the transfer cycle of data read from the coefficient table is disregarded, the latency is 36 (=4×9) cycles. However, the transfer cycle of data read from the coefficient table cannot actually be disregarded, and the reference time for the large-capacity coefficient table as shown in FIG. 2 is considered to be predominant. Therefore, the latency is 36 cycles or more.

In this embodiment described below, a decrease in the capacity of the coefficient table and a reduction in the size of the calculation processing circuit are realized by further transforming the equation (15) and changing the coefficients stored in the coefficient table.

3. Method in Present Embodiment

The error function calculation device in this embodiment calculates the error function $F_M(T)$ which has a variable T (positive real number) and an order M (M is an integer of 0 or more). The error function calculation device includes a coefficient table and a calculation section (calculator or processor). The coefficient table is realized by hardware such as a read only memory (ROM), a random access memory (RAM), or a flip-flop, for example. The calculation section is realized by hardware such as an ASIC or a dedicated circuit. The calculation section may be realized by a central processing unit (CPU) and a program (firmware) for causing the CPU to operate.

The coefficient table stores the value of $F_{M+i}(T_0)/F_M(T_0)$ (i is at least one integer among 1 to n) calculated for a predetermined $T_0$, obtained by an n-th order (n is a natural number) polynomial approximation of the error function $F_M(T)$, or a value obtained by multiplying the value of $F_{M+i}(T_0)/F_M(T_0)$ by a constant. The calculation section reads the value of $F_{M+i}(T_0)/F_M(T_0)$ or the value obtained by multiplying the value of $F_{M+i}(T_0)/F_M(T_0)$ by a constant from the coefficient table, and performs at least a part of the processing of calculating the value of the error function $F_M(T)$ by a fixed-point arithmetic using the value of $F_{M+i}(T_0)/F_M(T_0)$ or the value obtained by multiplying the value of $F_{M+i}(T_0)/F_M(T_0)$ by a constant.

In order to realize such an error function calculation device, a coefficient obtained by transforming the error function $F_M(T)$ as expressed by the following equation (17) is stored in the coefficient table as fixed-point data.

$$\begin{aligned} f_M(T) &= f_M(T_0 + \varepsilon) \qquad (17) \\ &= C\{F_M(T_0) + (-\varepsilon)\{F_{M+1}(T_0) + \\ &\quad \frac{(-\varepsilon)}{2}\{F_{M+2}(T_0) + \frac{-\varepsilon}{3}F_{M+3}(T_0)\}\}\} \\ &= CF_M(T_0)\left\{1 + (-\varepsilon)\left\{\frac{F_{M+1}(T_0)}{F_M(T_0)} + \right.\right. \\ &\quad \left.\left.(-\varepsilon)\left\{\frac{1}{2}\frac{F_{M+2}(T_0)}{F_M(T_0)} + (-\varepsilon)\frac{1}{6}\frac{F_{M+3}(T_0)}{F_M(T_0)}\right\}\right\}\right\} \end{aligned}$$

The following description illustrates an example in which the error function $F_M(T)$ is approximated by a third-order Taylor approximation. However, the error function $F_M(T)$ may be approximated by a second-order or fourth or higher order Taylor approximation. C is a constant.

The equation (17) can be derived as described below. The error function $F_M(T)$ can be Taylor-expanded as expressed by the following equation (18).

$$\begin{aligned} F_M(T) &= F_M(T_0 + \varepsilon) \qquad (18) \\ &= F_M(T_0) + \varepsilon\frac{d}{dT}F_M(T)_{T=T_0} + \\ &\quad \frac{1}{2!}\varepsilon^2\frac{d^2}{dT^2}F_M(T)_{T=T_0} + \frac{1}{3!}\varepsilon^3 F_M(T)_{T=T_0} + \ldots \end{aligned}$$

The differentiation result of the error function $F_M(T)$ is $-F_{M+1}(T)$ as expressed by the following equation (19) from the nature of the error function $F_M(T)$.

$$\frac{d}{dT}F_M(T) = \int_0^1 dt\, t^{2M} \frac{d}{dT}\exp[-Tt^2] \qquad (19)$$

$$= \int_0^1 dt\, t^{2M}(-t^2)\exp[-Tt^2]$$

$$= -\int_0^1 dt\, t^{2(M+1)}\exp[-Tt^2] = -F_{M+1}(T)$$

Specifically, the differentiation result is generalized as expressed by the following equation (20) (k is a natural number) by repeating the differentiation.

$$\frac{d^k}{dT^k}F_M(T) = (-1)^k F_{M+k}(T) \qquad (20)$$

Substituting the equation (20) into the equation (18) yields an equation (21) equivalent to the equation (17).

$$F_M(T) = F_M(T_0 + \varepsilon) \qquad (21)$$

$$= F_M(T_0) + \varepsilon(-1)F_{M+1}(T)_{T=T0} +$$

$$\frac{1}{2!}\varepsilon^2(-1)^2 F_{M+2}(T)_{T=T0} +$$

$$\frac{1}{3!}\varepsilon^3(-1)^3 F_{M+3}(T)_{T=T0} + \ldots$$

Since the following equation (22) is satisfied in the integration range of 0 to 1, the integrand of the error function $F_M(T)$ expressed by the equation (13) satisfies the relationship $F_{M+k} < F_M$ when integrating the integrand in the integration range of 0 to 1.

$$0 < t^{2(M+k)}\exp[-Tt^2] < t^{2M}\exp[-Tt^2] \qquad (22)$$

If $F_M(T) = C \cdot F_M(T_0) \cdot g(\varepsilon)$ in the equation (17), $g(\varepsilon)$ is expressed by the following equation (23).

$$g(\varepsilon) = 1 + (-\varepsilon)\left\{\frac{F_{M+1}(T_0)}{F_M(T_0)} + \right. \qquad (23)$$

$$(-\varepsilon)\left\{\frac{1}{2}\frac{F_{M+2}(T_0)}{F_M(T_0)} + \right.$$

$$\left.\left.(-\varepsilon)\left\{\frac{1}{6}\frac{F_{M+3}(T_0)}{F_M(T_0)} + \ldots\right\}\right\}\right\}$$

Since $F_{M+k} < F_M$ as described above, $(F_{M+1}/F_M) < 1$, $(F_{M+2}/F_M) < 1$, and $(F_{M+3}/F_M) < 1$ are satisfied in the equation (23). Therefore, the range of $g(\varepsilon)$ expressed by the equation (23) is expressed as the following equations (24) and (25).

$$g(\varepsilon) < 1 + |\varepsilon| + \frac{1}{2!}|\varepsilon|^2 + \frac{1}{3!}|\varepsilon|^3 + \ldots + \frac{1}{n!}|\varepsilon|^n + \ldots = \exp|\varepsilon| \qquad (24)$$

$$g(\varepsilon) > 1 - |\varepsilon| - \frac{1}{3!}|\varepsilon|^3 - \ldots - \frac{1}{(2k+1)!}|\varepsilon|^{2k+1} - \ldots = \qquad (25)$$

$$1 - \frac{\exp(\varepsilon) - \exp(-\varepsilon)}{2}$$

Since $\varepsilon$ is sufficiently smaller than 1, $g(\varepsilon)$ is in the range of 0.5 to 2. Specifically, $g(\varepsilon)$ can be calculated by a fixed-point arithmetic. This means that it suffices to calculate $g(\varepsilon)$ by repeating fixed-point multiplication-accumulation calculation four times and calculate the product of the result and the floating-point data $CF_M(T_0)$.

Therefore, it suffices that the coefficient table in this embodiment store at least the value of the next coefficient (value of $F_{M+i}(T_0)/F_M(T_0)$ (i is at least one integer among 1 to n) or a value obtained by multiplying the value of $F_{M+i}(T_0)/F_M(T_0)$ by a constant in a broad sense) as fixed-point data. It is preferable to store the value of the coefficient $CF_M(T_0)$ (double-precision floating-point data) in the coefficient table.

$$\frac{F_{M+1}(T_0)}{F_M(T_0)}, \frac{1}{2}\frac{F_{M+2}(T_0)}{F_M(T_0)}, \frac{1}{6}\frac{F_{M+3}(T_0)}{F_M(T_0)} \qquad (26)$$

Figure 4:
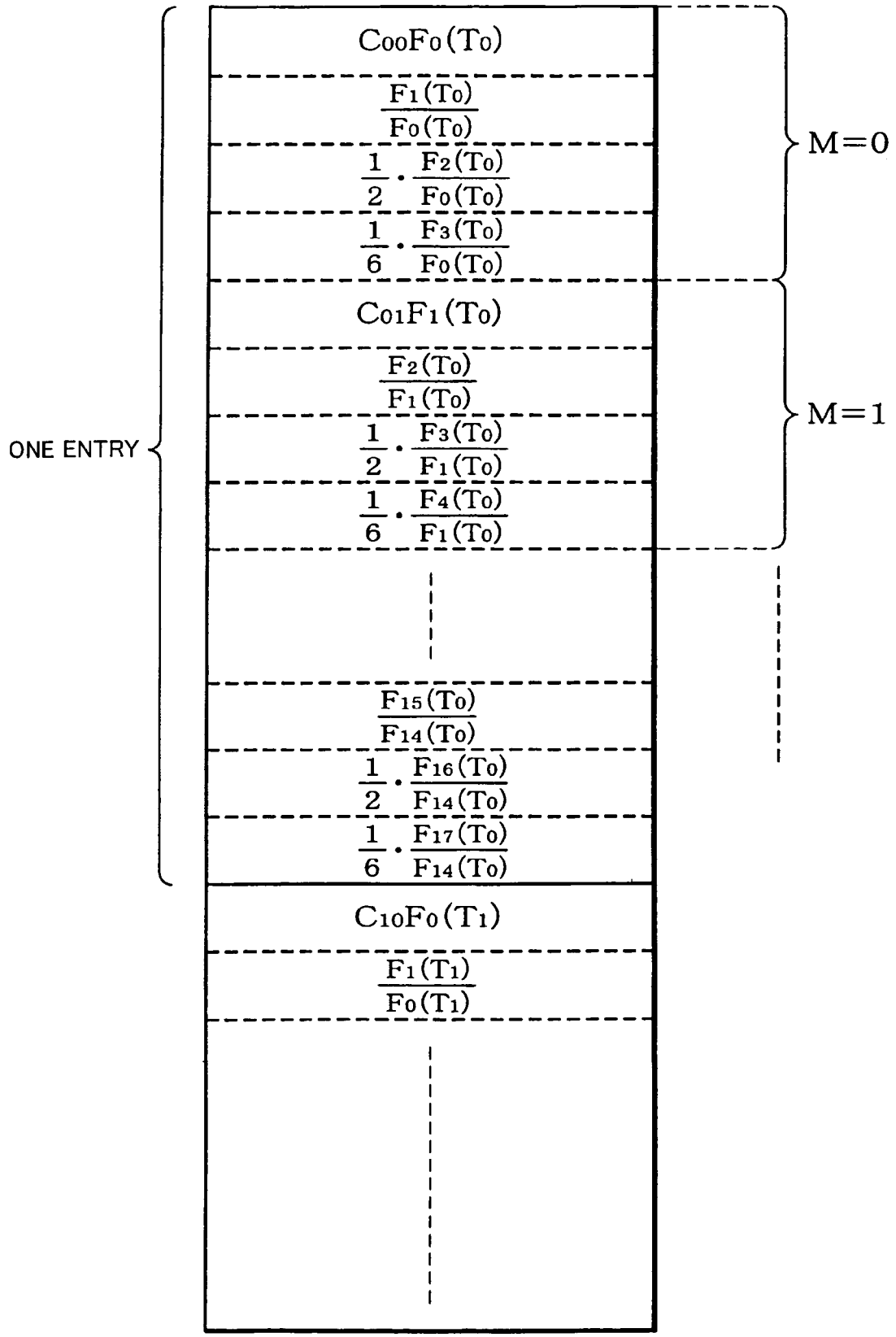
FIG. 4 is a schematic diagram of a coefficient table in an embodiment of the present invention.

FIG. 4 shows a diagram which schematically shows a coefficient table in this embodiment. Coefficients are stored in the coefficient table in this embodiment for each of $T_0, T_1, T_2, \ldots$ determined in advance corresponding to the range of the input variable T. $C_{00}F_0(T_0)$, $F_1(T_0)/F_0(T_0)$, $F_2(T_0)/(2F_0(T_0))$, $F_3(T_0)/(6F_0(T_0))$, $C_{01}F_1(T_0)$, $F_2(T_0)/F_1(T_0)$, $F_3(T_0)/(2F_1(T_0))$, $F_4(T_0)/(6F_1(T_0))$, ... are stored for $T_0$. $C_{00}, C_{01}, \ldots$ are constants.

In FIG. 4, some of the coefficients are stored as double-precision floating-point data such as the coefficient $C_{00}F_0(T_0)$, whereby the number of coefficients which should be stored for one entry is increased. However, since it suffices that most coefficients be stored as fixed-point data, the capacity of the coefficient table may be reduced. Moreover, the capacity of the coefficient table can be significantly reduced by modifying the coefficient table as described later.

The error function calculation device in this embodiment need not calculate the error function $F_M(T)$ using a double-precision floating-point multiplier and a double-precision floating-point adder as in the comparative example by modifying the product of the coefficient $CF_M(T_0)$ and $g(\varepsilon)$ as described later, whereby an error function calculation device which can accelerate the error function calculation at low cost using a configuration suitable for integration can be provided.

In the calculation method in this embodiment, the latency of the calculation processing is reduced as described below.

Figure 5:
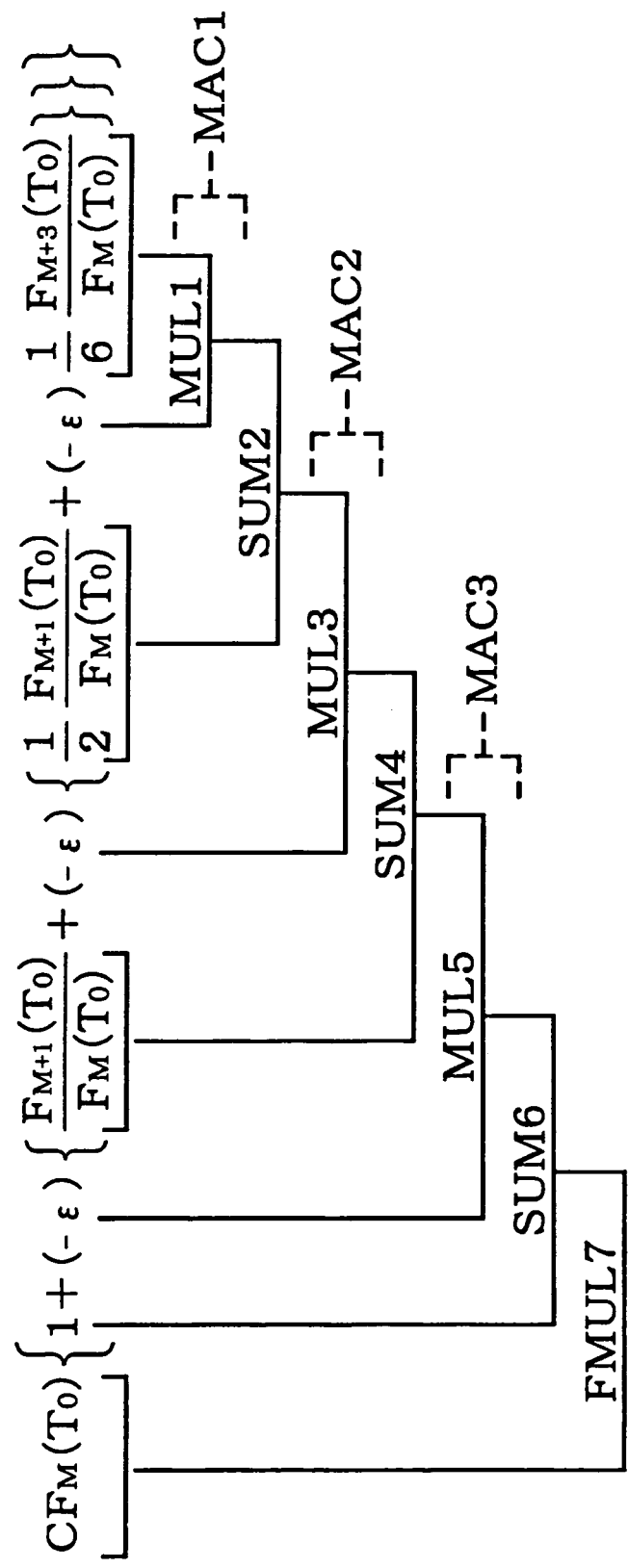
FIG. 5 is illustrative of latency of calculation processing by using an error function calculation method in this embodiment.

FIG. 5 shows an explanatory diagram of the latency of calculation processing using the error function calculation method in this embodiment.

FIG. 5 shows the order of calculation processing of the equation (17). Specifically, the calculation processing of the equation (17) is performed in the order of multiplication (MUL1)→summation (SUM2)→multiplication (MUL3)→summation (SUM4)→multiplication (MUL5)→summation (SUM6)→multiplication (FMUL7). The multiplication (MUL1)→summation (SUM2) can be calculated by multiplication-accumulation (MAC1). The multiplication (MUL3)→summation (SUM4)→can be calculated by multiplication-accumulation (MAC2). The multiplication (MUL5)→summation (SUM6) can be calculated by multiplication-accumulation (MAC3). Therefore, the calculation processing of the equation (17) is performed in the order of multiplication-accumulation (MAC1)→multiplication-accumulation (MAC2)→multiplication-accumulation (MAC3)→multiplication (FMUL7).

If the latency of the multiplication-accumulation is three cycles (multiplication is two cycles and summation is one cycle), the multiplication-accumulation calculation result is obtained in 9 (=3×3) cycles. Therefore, the total latency is 13 cycles even if the final multiplication (FMUL7) is implemented by double-precision floating-point multiplication processing. Therefore, the calculation speed of the error function can be reduced by about ⅓ in comparison with the comparative example. There is a great significance in calculating a part of the equation (17) using the multiplication-accumulation calculator which performs a fixed-point arithmetic.

Moreover, the error function can be calculated with high accuracy at high speed using the multiplication-accumulation calculator which performs a fixed-point arithmetic by simplifying the multiplication processing of the multiplication (FMUL7) as described later by utilizing the nature of the error function.

3.1 Recurrence Equation

The capacity of the coefficient table in this embodiment shown in FIG. 4 can be significantly reduced by using a recurrence equation expressed by the following equation (27).

$$F_{M-1}(T) = \frac{1}{2M-1}\{\exp(-T) + 2TF_M(T)\} \quad (27)$$

The equation (27) is derived as follows.

$$F_{M-1}(T) \equiv \int_0^1 dt\, t^{2(M-1)}\exp[-Tt^2] \quad (28)$$

$$= \int_0^1 dt\left\{\frac{d}{dt}\left(\frac{t^{2M-1}}{2M-1}\right)\right\}\exp[-Tt^2]$$

$$= \left|\frac{t^{2M-1}}{2M-1}\exp[-Tt^2]\right|_0^1 + \frac{2T}{2M-1}F_M(T)$$

$$= \frac{1}{2M-1}\{\exp(-T) + 2TF_M(T)\}$$

Therefore, only the coefficient when M is 17 is stored in the coefficient table, and the remaining coefficients are sequentially calculated according to the equation (27) ($F_{16}(T_0)$, $F_{15}(T_0)$, . . . , and $F_0(T_0)$ for the variable $T_0$, $F_{16}(T_1)$, $F_{15}(T_1)$, . . . and $F_0(T_1)$ for the variable $T_1$, . . . ). This significantly reduces the capacity of the coefficient table.

3.2 Order of Polynomial Approximation $g(\epsilon)$ expressed by the equation (23) is the equation approximated by a third-order Taylor approximation. If the error of $g(\epsilon)$ is denoted by $\delta g(\epsilon)$, since $-2^{-11} \leq \epsilon < 2^{-11}$ at a step width of 1/1024, $\delta g(\epsilon)$ is expressed by a fourth-order term of a Taylor approximation shown by the following equation (29).

$$\delta P(\epsilon) \cong \left|\frac{1}{2\times 3\times 4}\frac{F_{M+4}(T_0)}{F_M(T_0)}\epsilon^4\right| < \frac{|\epsilon^4|}{24} < 2^{-11\times 4-4.5} = 2^{-48.5} \quad (29)$$

It is expected that the same degree of error can be maintained, even if the step width is increased, by increasing the order of the polynomial approximation. The number of entries of the coefficient table can be halved by doubling the step width. On the other hand, even if the order is increased by 1, the number of coefficients which should be stored is increased only by 1, and the amount of data for one entry of the coefficient table is not doubled.

The case where the polynomial approximation is fourth order and the step width of the input variable T is set at 1/256 is considered below. Since the error $\delta g(\epsilon)$ of $g(\epsilon)$ is $-2^{-9} \leq \epsilon < 2^{-9}$ at a step width of 1/256, $\delta g(\epsilon)$ is expressed by the fifth-order term of the Taylor approximation expressed by the following equation (30).

$$\delta P(\epsilon) \cong \left|\frac{1}{2\times 3\times 4\times 5}\frac{F_{M+5}(T_0)}{F_M(T_0)}\epsilon^5\right| < \frac{|\epsilon^5|}{120} < 2^{-9\times 5-6.9} = 2^{-51.9} \quad (30)$$

When comparing the equation (29) with the equation (30), the accuracy of $g(\epsilon)$ is higher in the fourth-order polynomial approximation than in the third-order polynomial approximation.

The case where the polynomial approximation is fifth order and the step width of the input variable T is set at 1/128 is considered below. Since the error $\delta g(\epsilon)$ of $g(\epsilon)$ is $-2^{-8} \leq \epsilon < 2^{-8}$ at a step width of 1/128, $\delta g(\epsilon)$ is expressed by the sixth-order term of the Taylor approximation expressed by the following equation (31).

$$\delta P(\epsilon) \cong \left|\frac{1}{2\times 3\times 4\times 5\times 6}\frac{F_{M+6}(T_0)}{F_M(T_0)}\epsilon^6\right| < \frac{|\epsilon^6|}{720} < 2^{-8\times 6-9.5} = 2^{-57.5} \quad (31)$$

When comparing the equation (30) with the equation (31), the accuracy of $g(\epsilon)$ is higher in the fifth-order polynomial approximation than in the fourth-order polynomial approximation. The step width of the input variable T can be increased by increasing the order n of the polynomial approximation. As a result, the number of entries of the coefficient table can be significantly reduced, whereby the capacity of the coefficient table can be reduced to a large extent.

3.3 Access to Coefficient Table

When accessing the above-described coefficient table, it is necessary to generate an index for accessing the coefficient table corresponding to the input variable T. However, since the Obara algorithm changes the step width depending on the value T as shown in FIG. 2, it is necessary to generate an index after judging the range of the input variable T. This processing makes it necessary to compare the size of the variable T (whether or not the variable T is 22 or more, for example) and to calculate the index by a double-precision floating-point arithmetic.

Therefore, this embodiment makes it unnecessary to compare the size of the variable T and to calculate the index by a double-precision floating-point arithmetic by accessing the coefficient table based on the decode result of the input variable T in a format conforming to IEEE 754 from a decoder as described below.

Figures 6A, 6B:
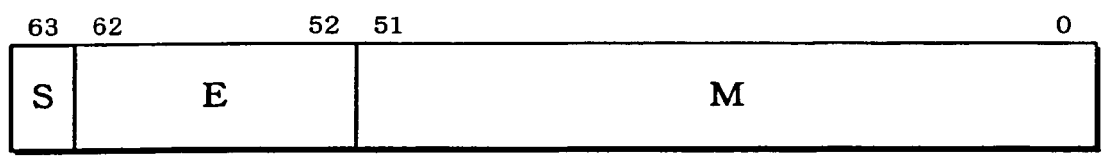
FIGS. 6A and 6B are illustrative of a format conforming to IEEE 754.

FIGS. 6A and 6B show explanatory diagrams of the format conforming to IEEE 754. A double-precision floating point conforming to IEEE 754 is expressed as shown in FIG. 6A.

The double-precision floating point expressed as shown in FIG. 6A includes a 1-bit sign S, a 11-bit exponent part E, and a 52-bit mantissa part M, as shown in FIG. 6B. A value obtained by adding a bias value (1023 in the case of double-precision floating point) to the exponent shown in FIG. 6A is indicated by the exponent part E in binary numbers. In IEEE 754, since "1" at the head of the normalized binary numbers is not provided in the mantissa part M, the actual length of the mantissa is 53 bits by normalization.

Figure 7:
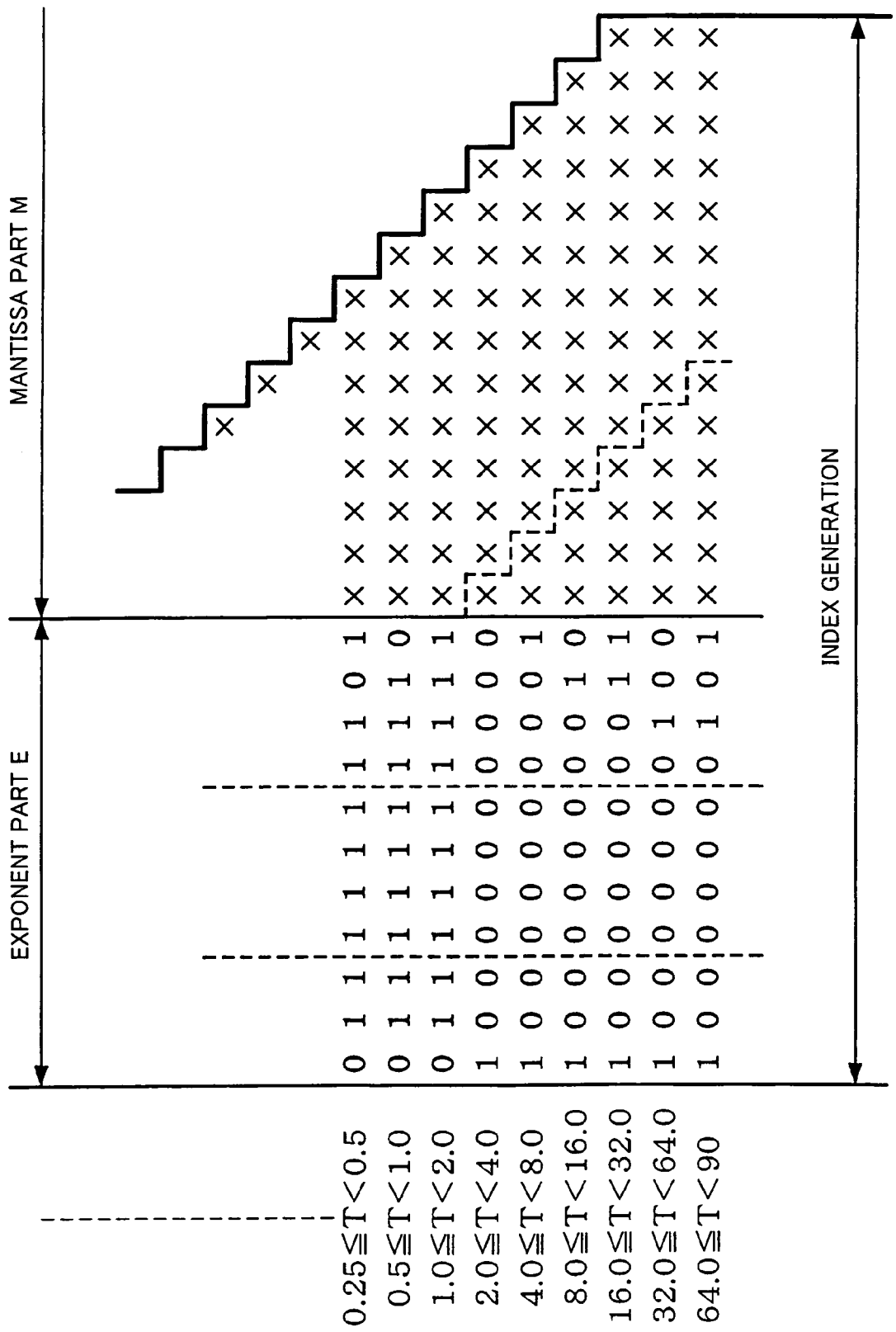
FIG. 7 is illustrative of an operation of a decoder which decodes a variable in the format shown in FIG. 6B.

FIG. 7 shows an explanatory diagram of an operation of a decoder which decodes the variable T in the format shown in FIG. 6B. The decoder generates an index based on the exponent part of the variable T in double-precision floating-point (floating-point in a broad sense) representation and higher-order bits of the mantissa part of the variable T.

For example, in the range in which the value of the input variable T is $16.0 \leq T < 90$, the decoder generates an index based on the exponent part E of the variable T and higher-order 14 bits of the mantissa part M. In the range in which the value of the input variable T is $4.0 \leq T < 8.0$, the decoder generates an index based on the exponent part E of the variable T and higher-order 13 bits of the mantissa part M. As described above, in the range in which the value of the input variable T is smaller than 16, the number of higher-order bits of the mantissa part M for generating an index is reduced by one as the value of the exponent part E is reduced by one.

The coefficient table can be accessed without performing size comparison by a double-precision floating-point arithmetic by generating an index based on the decode result from the decoder. Moreover, since the number of higher-order bits of the mantissa part M is changed by the value of the exponent part E, the error function calculation device can be easily configured so that the step width is reduced as the input variable T is smaller when the input is 16 or more and the step width is made constant when the input is smaller than 16. Therefore, the value of the error function can be calculated with high accuracy without comparing the variable T with the boundary value of the range of the variable T, such as 22 or 45, by a floating-point arithmetic as shown in FIG. 2.

4. Error Function Calculation Device

Figure 8:
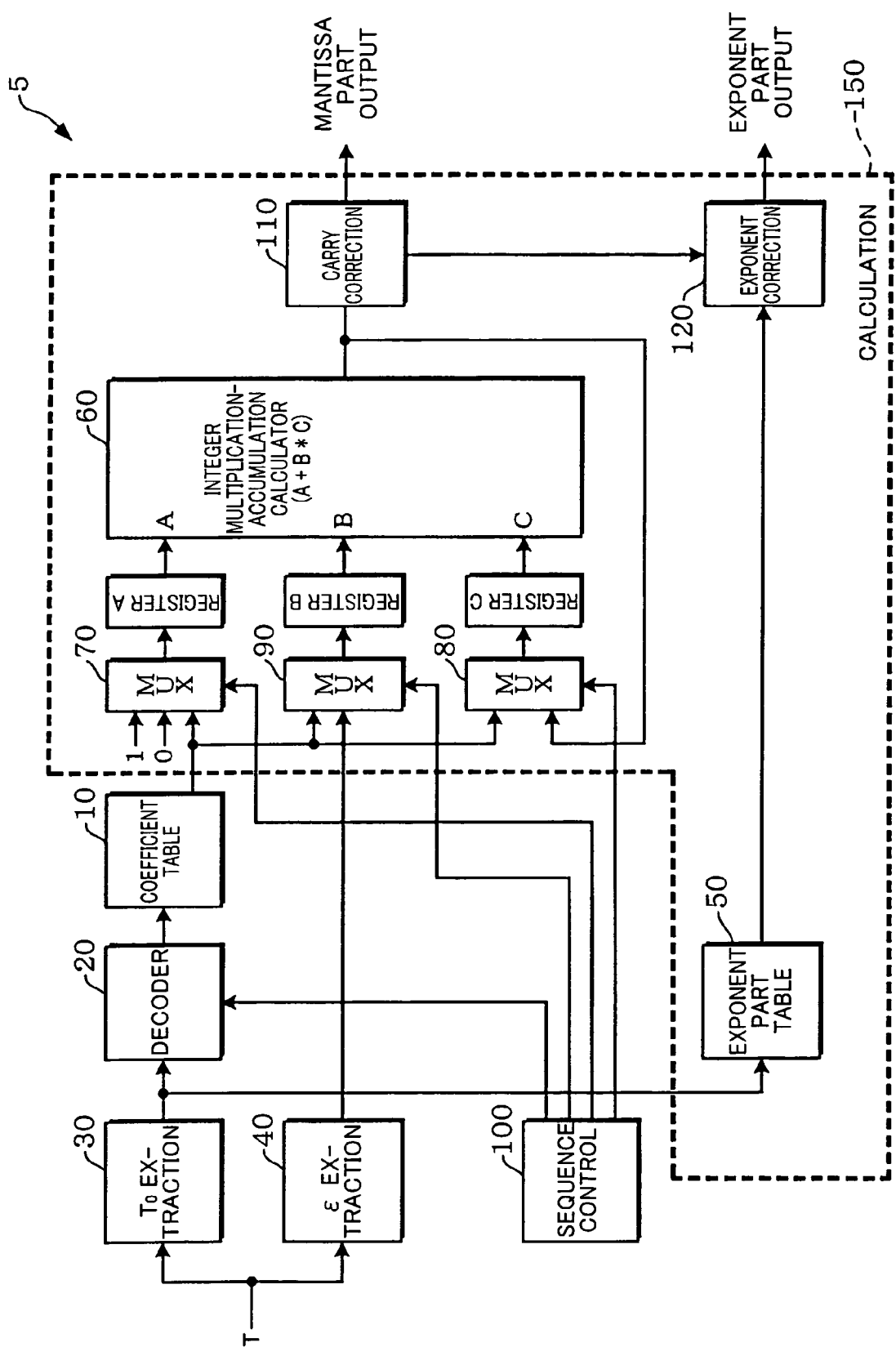
FIG. 8 is a block diagram of a detailed configuration example of an error function calculation device in this embodiment.

FIG. 8 shows a block diagram of a detailed configuration example of the error function calculation device in this embodiment.

An error function calculation device 5 in this embodiment includes a coefficient table 10. The coefficient table 10 stores the values of the coefficients shown in FIG. 4. The coefficient table 10 outputs the values of the coefficients stored in a storage region corresponding to an index generated by a decoder 20.

The error function calculation device 5 includes the decoder 20. The decoder 20 generates an index based on the exponent part of the input variable T in double-precision floating-point representation and higher-order bits of the mantissa part of the input variable T, as shown in FIG. 7.

The error function calculation device 5 includes a $T_0$ extraction section 30 and an $\epsilon$ extraction section 40. The input variable T in double-precision floating-point representation is input to the error function calculation device 5.

Figure 9:
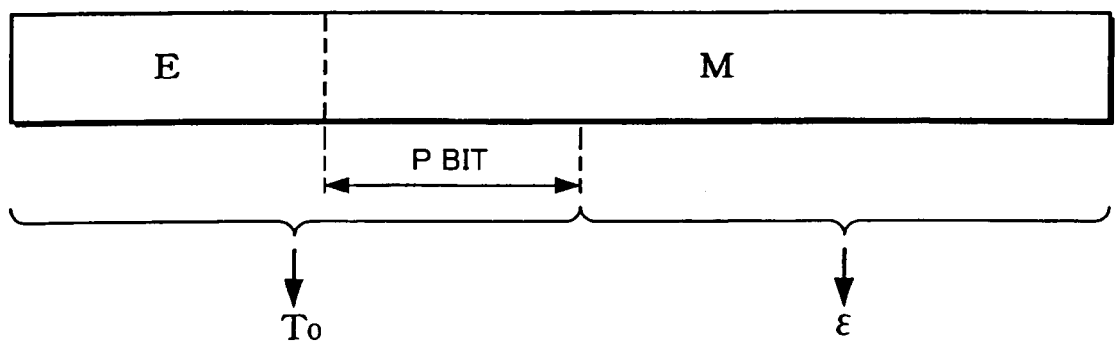
FIG. 9 is illustrative of operations of a $T_0$ extraction section and an $\varepsilon$ extraction section.

FIG. 9 shows an operation explanatory diagram of the $T_0$ extraction section 30 and the $\epsilon$ extraction section 40.

The $T_0$ extraction section 30 extracts the exponent part of the input variable T in double-precision floating-point representation and high-order P (P is a positive integer) bits of the mantissa part of the input variable T. The value P is determined in advance, and is a value greater than the number of higher-order bits of the mantissa part of the input variable T referred to by the decoder 20 shown in FIG. 7.

In FIG. 8, the $\epsilon$ extraction section 40 extracts the remaining lower-order bits of the mantissa part of the input variable T in double-precision floating-point representation. Specifically, the difference between the input variable T and the value extracted by the $T_0$ extraction section 30 is the value extracted by the $\epsilon$ extraction section 40.

The output from the $T_0$ extraction section 30 is supplied to the decoder 20 and an exponent part table 50. The output from the $\epsilon$ extraction section 40 is supplied to a register B.

The error function calculation device 5 includes an integer multiplication-accumulation calculator 60 which performs a fixed-point multiplication-accumulation calculation. A value stored in each of a register A, register B, and register C is input to the integer multiplication-accumulation calculator 60. If the value stored in the register A is denoted by A, the value stored in the register B is denoted by B, and the value stored in the register C is denoted by C, the integer multiplication-accumulation calculator 60 calculates the value of $(A+B \times C)$ by a fixed-point arithmetic, and outputs the calculated value. The error function calculation device 5 includes selectors (MUX) 70, 80, and 90. The selectors 70, 80, and 90 are switch-controlled by a sequence control section 100.

The error function calculation device 5 includes the sequence control section 100. The sequence control section 100 controls the decoder 20 in addition to the selectors 70, 80, and 90, thereby controlling the calculation processing of the integer multiplication-accumulation calculator 60.

Figure 10A:
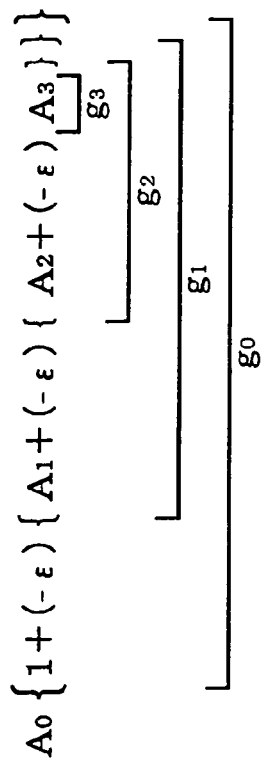
FIGS. 10A and 10B are illustrative of an operation of an integer multiplication-accumulation calculator.
Figure 10B:
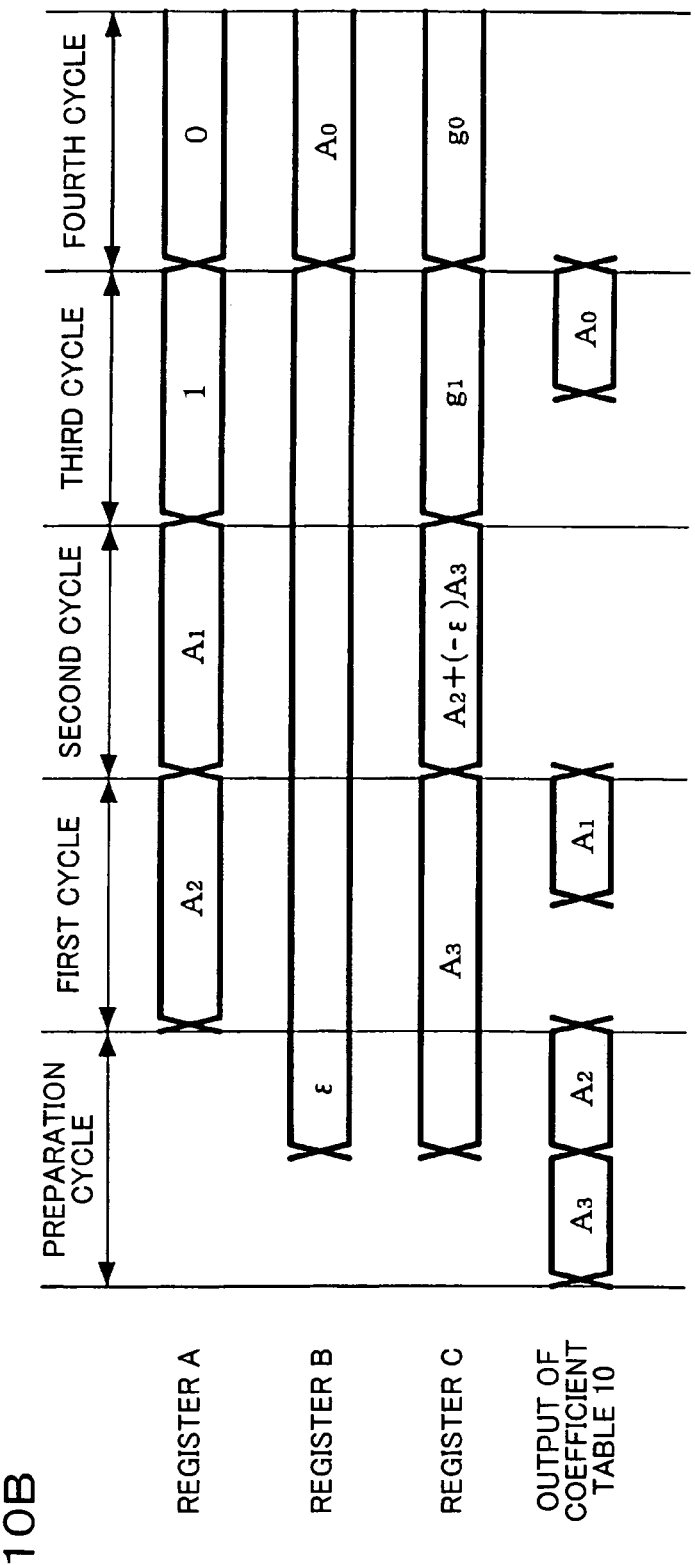

FIGS. 10A and 10B are operation explanatory diagrams of the integer multiplication-accumulation calculator 60. The following description illustrates the case of calculating an equation shown in FIG. 10A, which corresponds to the equation (17). Coefficients $A_0$, $A_1$, $A_2$, and $A_3$ are stored in the coefficient table 10. In FIG. 10A, $\epsilon$ is extracted by the $\epsilon$ extraction section 40.

When the input variable T is input, the $T_0$ extraction section 30 and the $\epsilon$ extraction section 40 respectively extract $T_0$ and $\epsilon$ in a preparation cycle. The sequence control section 100 causes the decoder 20 to generate an index for reading the coefficients $A_2$ and $A_3$ corresponding to the value of $T_0$. As a result, the coefficient table 10 outputs the stored coefficients $A_3$ ($=g_3$) and $A_2$ corresponding to the index. The selector 70 sets the coefficient $A_2$ from the coefficient table 10 in the register A, the selector 80 sets the coefficient $A_3$ from the coefficient table 10 in the register C, and the selector 90 sets $\epsilon$ extracted by the $\epsilon$ extraction section 40 in the register B. Therefore, the integer multiplication-accumulation calculator 60 outputs $(A_2+(-\epsilon) \times A_3)$ ($=g_2$) in a first cycle, and stores it in the register C in the subsequent second cycle.

The sequence control section 100 causes the decoder 20 to generate an index for reading the coefficient $A_1$ corresponding to the value of $T_0$ in the first cycle. As a result, the coefficient table 10 outputs the stored coefficient $A_1$ corresponding to the index, the selector 70 sets the coefficient $A_1$ from the coefficient table 10 in the register A, and the selector 80 sets the integer multiplication-accumulation calculation result $g_2$ calculated in the first cycle in the register C. Therefore, the integer multiplication-accumulation calculator 60 outputs $(A_1+(-\epsilon) \times (A_2+(-\epsilon) \times A_3))(=g_1)$ in the second cycle, and stores it in the register C in the subsequent third cycle.

The sequence control section 100 causes the selector 70 to output "1" in the second cycle, and causes the selector 80 to set the integer multiplication-accumulation calculation result $g_1$ calculated in the second cycle in the register C. Therefore, the integer multiplication-accumulation calculator 60 outputs $(1+(-\epsilon) \times (A_1+(-\epsilon) \times (A_2+(-\epsilon) \times A_3)))(=g_0)$ in the third cycle, and stores it in the register C in the subsequent fourth cycle.

The sequence control section 100 causes the selector 70 to set "0" in the register A in the third cycle, causes the selector 80 to set the integer multiplication-accumulation calculation result g0 calculated in the third cycle in the register C, and causes the selector 90 to set the mantissa part ($=-A_{0m}$) of the coefficient $A_0$ output from the coefficient table 10 in the register B. Therefore, the integer multiplication-accumulation calculator 60 outputs $A_{0m} \times g_0$ in the fourth cycle. Specifically, the integer multiplication-accumulation calculator 60 implements multiplication of the mantissa part of the coefficient $A_0$ shown in FIG. 10A and $g(\epsilon)$ by a fixed-point arithmetic.

In FIG. 8, the exponent part table 50 outputs the exponent part of the coefficient $A_0$ corresponding to the input variable $T_0$ extracted by the $T_0$ extraction section 30. Suppose that $F_M(T) = A_0 \cdot g(\epsilon)$ in the equation (17). Specifically, $A_0 = CF_M(T_0)$ in the equation (17). The coefficient $A_0$ is expressed as $m \times 2^E (1 \leq m < 2)$ in double-precision floating-point representation. Since $0.5 < g(\epsilon) < 2$ from the equations (24) and (25), $0.5 < m \cdot g(\epsilon) < 4$. Therefore, $A_0 \cdot g(\epsilon)$ is calculated by a fixed-point multiplication-accumulation calculation of the mantissa part of the coefficient $A_0$ and $g(\epsilon)$. When the calculation result is normalized, the value of the exponent part of the calculated value is E or E+1.

Therefore, the exponent part table 50 outputs the exponent part of the coefficient $A_0$ corresponding to the input variable $T_0$ extracted by the $T_0$ extraction section 30.

The error function calculation device 5 includes a carry correction section 110 and an exponent correction section 120. An output from the integer multiplication-accumulation calculator 60 is supplied to the carry correction section 110. An output from the exponent part table 50 is supplied to the exponent correction section 120.

The carry correction section 110 detects the presence or absence of carrying of the mantissa part which is the output result from the integer multiplication-accumulation calculator 60. When the carry correction section 110 detects carrying of the mantissa part, the carry correction section 110 shifts the mantissa part to the right by one bit and outputs it as the mantissa part output, and notifies the exponent correction section 120 to that effect. In this case, the exponent correction section 120 adds "1" to the value of the exponent from the exponent part table 50 and outputs the resulting value as the exponent part output.

When the carry correction section 110 has not detected carrying of the mantissa part, the carry correction section 110 outputs the output from the integer multiplication-accumulation calculator 60 as the mantissa part output. The exponent correction section 120 outputs the value of the exponent from the exponent part table 50 as the exponent part output.

The product of the coefficient $A_0$ and the calculation result $g_0$ shown in FIG. 10A can be calculated as the value of the error function with high accuracy without performing double-precision floating-point multiplication processing by performing correction for normalization by the carry correction section 110 and the exponent correction section 120. Specifically, the coefficient table 10 stores the value obtained by multiplying $F_M(T_0)$ by a constant. The processing of calculating the value of the error function $F_M(T)$ is performed based on the calculation result of the fixed-point arithmetic using the value obtained by multiplying $F_{M+i}(T_0)/F_M(T_0)$ read from the coefficient table 10 by a constant and the value obtained by multiplying $F_M(T_0)$ by a constant. The coefficient table 10 may store the value of $F_M(T_0)$, and the value of the error function $F_M(T)$ may be calculated using the value obtained by multiplying $F_M(T_0)$ by a constant.

In the error function calculation device 5, the coefficient table 10 and the exponent part table 50 may be realized by a hardware circuit such as a ROM or a RAM. The integer multiplication-accumulation calculator 60 may be realized by a dedicated hardware circuit, or a CPU and firmware (software). The decoder 20, the $T_0$ extraction section 30, the $\epsilon$ extraction section 40, the carry correction section 110, and the exponent correction section 120 may be realized by a dedicated hardware circuit or a CPU and firmware (software).

In the error function calculation device 5, the calculation section 150 may include the exponent part table 50, the register A, the register B, the register C, the integer multiplication-accumulation calculator 60, the selector 70, the selector 80, the selector 90, the carry correction section 110, and the exponent correction section 120. The calculation section 150 may have a configuration in which some of these sections are omitted.

This embodiment illustrates an example in which the values of all the coefficients are stored in the coefficient table 10 in advance. However, the present invention is not limited thereto. For example, the coefficient table 10 may be formed by a RAM (memory whose storage content is can be rewritten), and the values of the coefficients when M is 17 may be stored in the coefficient table 10. The values of the coefficients when M is 0 to 16 may be calculated according to the recurrence equation shown by the equation (27), and the values of the coefficients shown in FIG. 4 may be calculated. Specifically, the coefficient table 10 stores the value of $F_{M+n}(T_0)$ (n is a natural number) calculated for a predetermined $T_0$. The value of $F_{M+m}(T_0)$ may be read from the coefficient table 10, and at least a part of the processing of calculating the value of the error function $F_M(T)$ may be performed by a fixed-point arithmetic using the values of $F_{M+n-1}(T_0), \ldots,$ and $F_M(T_0)$ calculated from the equation (27) and the value of $F_{M+n}(T_0)$ from the coefficient table 10.

If the coefficient table 10 shown in FIG. 8 stores the values of all the coefficients in the range in which M is 0 to 14, for example, the capacity of the coefficient table 10 is increased. When calculating the error function, it suffices that the values of the coefficients for one M be accessed at high speed. Therefore, in a modification of this embodiment, a value of $F_L(T_0)$ (L is an integer from 0 to M) or a value obtained by multiplying the value of $F_L(T_0)$ by a constant and the value of $F_{L+i}(T_0)/F_L(T_0)$ (i is an integer from 1 to n) or a value obtained by multiplying the value of $F_{L+i}(T_0)/F_L(T_0)$ by a constant are stored in an external memory. A value of $F_N(T_0)$ or a value obtained by multiplying the value of $F_N(T_0)$ by a constant and a value of $F_{N+i}(T_0)/F_N(T_0)$ or a value obtained by multiplying the value of $F_{N+i}(T_0)/F_N(T_0)$ by a constant stored in the external memory are read and written into the coefficient table.

Specifically, an external memory which stores the values of all the coefficients in the range in which M is 0 to 14 is provided outside the error function calculation device, for example. The coefficient table is formed by a RAM so that only the values of the coefficients for one M can be sequentially transferred from the external memory. This minimizes the capacity of the built-in RAM which stores the coefficient table in the error function calculation device, whereby a configuration which is more suitable for integration can be achieved.

Figure 11:
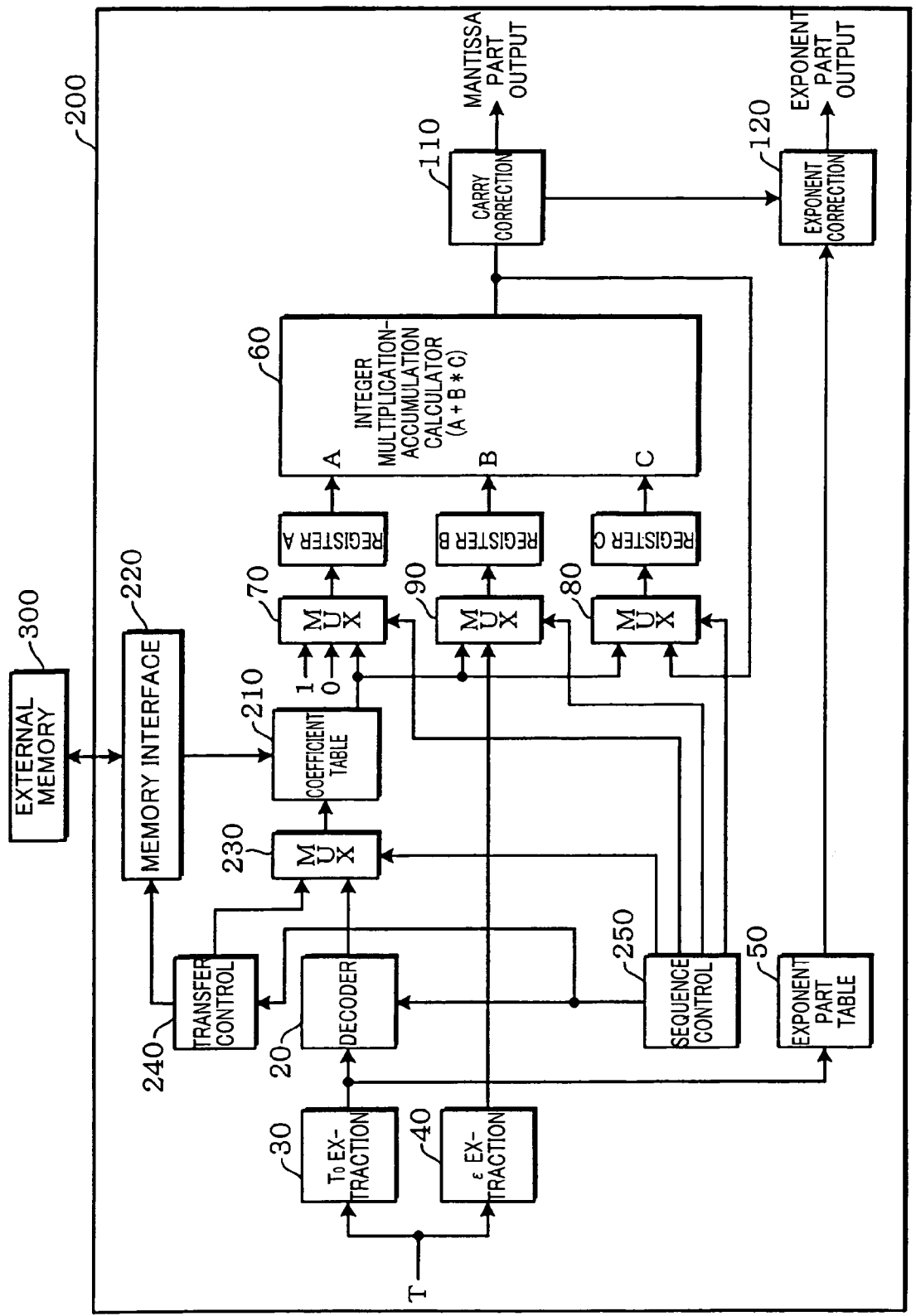
FIG. 11 is a block diagram of a configuration example of an error function calculation device in a modification of the embodiment of the present invention.

FIG. 11 shows a block diagram of a configuration example of the error function calculation device in the modification. In FIG. 11, sections the same as the sections of the error function calculation device 5 shown in FIG. 8 are denoted by the same symbols. Description of these sections is appropriately omitted.

An external memory 300 is connected with an error function calculation device 200 in the modification. The values of all the coefficients in the range in which M is 0 to 14, as shown in FIG. 4, are stored in the external memory 300, for example.

The error function calculation device 200 includes a coefficient table 210. Some of the values of the coefficients in the range in which M is 0 to 14 ($C_{00}F_0(T_0)$, $F_1(T_0)/F_0(T_0)$, $F_2(T_0)/(2F_0(T_0))$, $F_3(T_0)/(6F_0(T_0))$) stored in the external memory 300 are transferred to and written into the coefficient table 210. Therefore, the error function calculation device 200 includes a memory interface 220, a selector 230, and a transfer control section (transfer controller) 240.

The memory interface 220 performs data transfer interface processing with the external memory 300. The memory interface 220 is controlled by the transfer control section 240. In more detail, the memory interface 220 performs processing of reading data for one M directed by the transfer control section 240 from the external memory 300. The data output from the external memory 300 through the memory interface 220 is written into the coefficient table 210. In more detail, the data output from the external memory 300 through the memory interface 220 is written into the storage region of the coefficient table 210 corresponding to the index designated by the transfer control section 240.

Therefore, the selector 230 can output the index from the decoder 20 or the index from the transfer control section 240 to the coefficient table 210 by switch-control by the sequence control section 250.

The sequence control section 250 can control the transfer control section 240 and the selector 230 differing from the sequence control section 100 shown in FIG. 8.

FIG. 11 illustrates the case where the values of all the coefficients in the range in which M is 0 to 14, as shown in FIG. 4, are stored in the external memory 300. However, the present invention is not limited thereto. For example, the values of the coefficients when M is 17 may be stored in the external memory 300 in advance, the values of the coefficients when M is 0 to 16 may be calculated according to the recurrence equation shown in the equation (27), and the values of the coefficients shown in FIG. 4 may be written into the external memory 300. The values of the coefficients when M is 17 may be stored in advance in the external memory 300, the values of the coefficients when M is 0, the values of the coefficients when M is 1, . . . may be sequentially written into the external memory 300 according to the recurrence equation shown in the equation (27).

5. Application Example of Coprocessor

The error function calculation device in this embodiment or the modification of this embodiment may be applied to a coprocessor.

Figure 12:
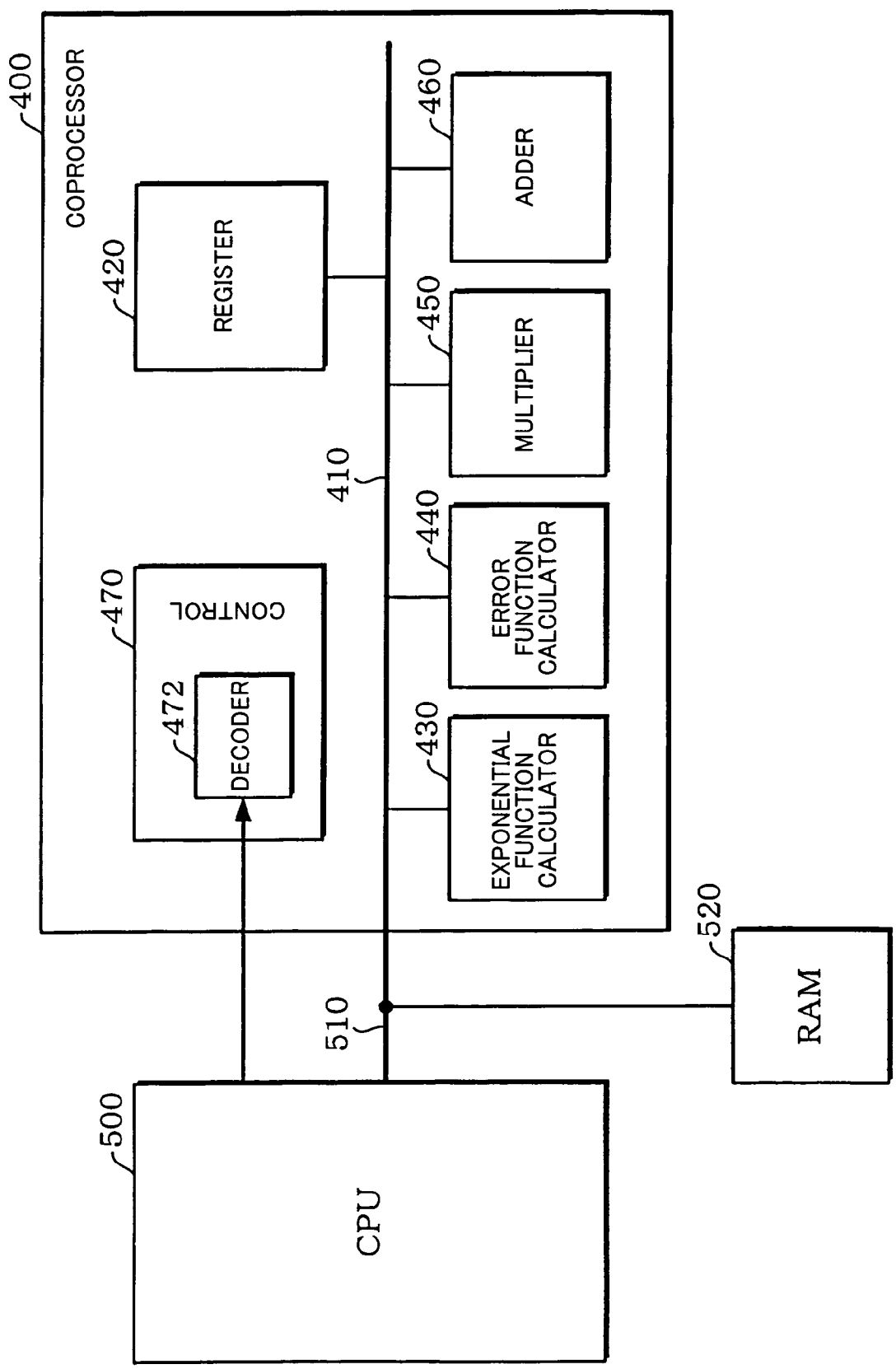
FIG. 12 is a block diagram of a configuration example of a coprocessor to which an error function calculation device in this embodiment or this modification is applied.

FIG. 12 shows a block diagram of a configuration example of a coprocessor to which the error function calculation device in this embodiment or the modification of this embodiment is applied.

A coprocessor 400 is connected with a CPU 500. The coprocessor 400 performs processing according to a command from the CPU 500, and outputs a numerical value calculation result, which is the processing result, to the CPU 500.

The coprocessor 400 and the CPU 500 are connected through a data bus 510. A RAM 520 is connected with the data bus 510. A program executed by the CPU 500 is stored in the RAM 520, for example. The RAM 520 is used as a work area necessary during the processing performed by the CPU 500 or the coprocessor 400.

When the CPU 500 executes the program stored in the RAM 520, the CPU 500 sequentially reads the program from the RAM 520, decodes the read program, and performs processing corresponding to the decode result. The CPU 500 may store in advance a program in a RAM or a ROM included in the CPU 500.

The coprocessor 400 includes a common bus 410. The common bus 410 is connected with the data bus 510. A register section 420, an exponential function calculator 430, an error function calculator 440, a multiplier 450, and an adder 460 are connected with the common bus 410. Therefore, the exponential function calculator 430, the error function calculator 440, the multiplier 450, and the adder 460 can share the register section 420.

The coprocessor 400 includes a control section 470. The control section 470 controls the register section 420, the exponential function calculator 430, the error function calculator 440, the multiplier 450, and the adder 460. In more detail, the control section 470 includes a decoder 472. The decoder 472 decodes a command from the CPU 500. The control section 470 directs start of calculation processing performed by each of the exponential function calculator 430, the error function calculator 440, the multiplier 450, and the adder 460 corresponding to the decode result from the decoder 472. The exponential function calculator 430, the error function calculator 440, the multiplier 450, and the adder 460 perform processing while referring to the value stored in the register section 420.

The exponential function calculator 430 performs an exponential calculation. In more detail, the exponential function calculator 430 performs the processing expressed by the equation (16), and calculates the error function $F_M(T)$ when the input variable T is greater than 90 in the two-electron integral calculation.

The error function calculation device 5 in this embodiment or the error function calculation device 200 in the modification may be applied as the error function calculator 440. When applying the error function calculation device 200 in the modification as the error function calculator 440, the RAM 520 may have the function of the external memory 300.

The multiplier 450 performs double-precision floating-point multiplication processing. The adder 460 performs double-precision floating-point addition processing.

When the CPU 500 performs calculation processing of the error function $F_M(T)$ during the execution of the program, the CPU 500 issues a command to the coprocessor 400. The coprocessor 400 decodes the command. The values of the input variable T and the order M may be designated by the command. The control section 470 may sequentially supply the predetermined values of the variable T and the order M to each section of the coprocessor 400 corresponding to issuance of the command from the CPU 500.

The calculation result of the error function $F_M(T)$ is obtained according to the equation (16) when the variable T is greater than 90, and the calculation result of the error function $F_M(T)$ is obtained by the error function calculator 440 according to the equation (17) when the variable T is 90 or less.

The configuration of the coprocessor 400 is not limited to the configuration shown in FIG. 12. A part of the coprocessor 400 shown in FIG. 12 may be omitted.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

This embodiment or the modification illustrates the case of approximating the error function by a Taylor approximation. However, the present invention is not limited thereto. Another polynomial approximation such as a Chebyshev approximation may be used.

In this embodiment or the modification, the value obtained by multiplying $F_{M+i}(T_0)/F_M(T_0)$ (i is at least one integer among 1 to n) calculated for a predetermined $T_0$, obtained by an n-th order (n is a natural number) polynomial approximation of the error function $F_M(T)$, by a constant is stored. However, the present invention is not limited thereto. The value of $F_{M+i}(T_0)/F_M(T_0)$ may be stored, and the calculation section may multiply the value of $F_{M+i}(T_0)/F_M(T_0)$ by a constant.

This embodiment or the modification illustrates the case of obtaining the calculation result of the error function in the ab initio molecular orbital method using the ab initio molecular orbital calculation. However, the present invention is not limited thereto. It is necessary to calculate the error function in a function calculation to which the Gaussian function is applied, and an arbitrary function can be expressed by overlapping of the Gaussian functions. Therefore, the present invention may also be applied to the case of calculating the error function in fields other than the field of the molecule orbital method.

Part of requirements of any claim of the present invention could be omitted from a dependent claim which depends on that claim. Moreover, part of requirements of any independent claim of the present invention could be made to depend on any other independent claim.

The invention claimed is:

1. An error function calculation device which performs processing of calculating an error function $F_M(T)$ defined by the following equation (1) and having T (positive real number) as a variable, t (0 to 1) as a function variable, and M (M is an integer of 0 or more) as an order, $$F_M(T) = \int_0^1 t^{2M} \exp(-Tt^2) dt \quad (1)$$

the error function calculation device comprising:
a coefficient table which stores a value of $F_{M+i}(T_0)/F_M(T_0)$ (i is at least one integer among 1 to n, and n is a natural number) calculated for a predetermined $T_0$, obtained by an n-th order polynomial approximation of the error function $F_M(T)$, or a value obtained by multiplying the value of $F_{M+i}(T_0)/F_M(T_0)$ by a constant; and
a calculation section which reads the value of $F_{M+i}(T_0)/F_M(T_0)$ or the value obtained by multiplying the value of $F_{M+i}(T_0)/F_M(T_0)$ by a constant from the coefficient table, and performs at least a part of the processing of calculating a value of the error function $F_M(T)$ by a fixed-point arithmetic using the value of $F_{M+i}(T_0)/F_M(T_0)$ or the value obtained by multiplying the value of $F_{M+i}(T_0)/F_M(T_0)$ by a constant.

2. The error function calculation device as defined in claim 1, wherein the value of $F_{M+i}(T_0)/F_M(T_0)$ or the value obtained by multiplying the value of $F_{M+i}(T_0)/F_M(T_0)$ by a constant is a fixed-point value.

3. The error function calculation device as defined in claim 1, comprising:
a decoder which generates an index for reading the value stored in the coefficient table,
wherein the decoder generates the index based on an exponent part of the variable T in floating-point representation and a higher-order bit of a mantissa part of the variable T.

4. The error function calculation device as defined in claim 1, wherein the polynomial approximation is a Taylor approximation.

5. The error function calculation device as defined in claim 1, wherein the calculation section performs processing of calculating at least a part of the following equation (2) by a fixed-point arithmetic wherein C is a constant and $\epsilon$ is a displacement $$F_M(T) = CF_M(T_0)\left\{1 + (-\epsilon)\left\{\frac{F_{M+1}(T_0)}{F_M(T_0)} + (-\epsilon)\left\{\frac{1}{2}\frac{F_{M+2}(T_0)}{F_M(T_0)} + (-\epsilon)\frac{1}{6}\frac{F_{M+3}(T_0)}{F_M(T_0)} + \ldots\right\}\right\}\right\}. \quad (2)$$

6. The error function calculation device as defined in claim 5, wherein the coefficient table stores a value of $F_M(T_0)$ or a value obtained by multiplying the value of $F_M(T_0)$ by a constant, and
wherein the calculation section performs the processing of calculating the value of the error function $F_M(T)$ based on a calculation result of a fixed-point arithmetic using the value of $F_{M+i}(T_0)/F_M(T_0)$ or the value obtained by multiplying the value of $F_{M+i}(T_0)/F_M(T_0)$ by a constant read from the coefficient table and the value of $F_M(T_0)$ or the value obtained by multiplying the value of $F_M(T_0)$ by a constant.

7. The error function calculation device as defined in claim 5, wherein the coefficient table is formed by a memory, storage content of which is rewritten.

8. The error function calculation device as defined in claim 7, comprising:
a transfer control section which transfers data stored in an external memory to the coefficient table,
wherein the external memory stores a value of $F_L(T_0)$ (L is an integer from 0 to M) or a value obtained by multiplying the value of $F_L(T_0)$ by a constant and a value of $F_{L+i}(T_0)/F_L(T_0)$ (i is an integer from 1 to n) or a value obtained by multiplying the value of $F_{L+i}(T_0)/F_L(T_0)$ by a constant,
wherein the transfer control section reads a value of $F_N(T_0)$ (N is an integer from 0 to M) or a value obtained by multiplying the value of $F_N(T_0)$ by a constant and a value of $F_{N+i}(T_0)/F_N(T_0)$ or a value obtained by multiplying the value of $F_{N+i}(T_0)/F_N(T_0)$ by a constant, and writes the value of $F_{N+i}(T_0)/F_N(T_0)$ or the value obtained by multiplying the value of $F_{N+i}(T_0)/F_N(T_0)$ by a constant into the coefficient table, the value of $F_N(T_0)$ or the value obtained by multiplying the value of $F_N(T_0)$ by a constant and the value of $F_{N+i}(T_0)/F_N(T_0)$ or the value obtained by multiplying the value of $F_{N+i}(T_0)/F_N(T_0)$ by a constant being stored in the external memory, and
wherein the calculation section performs at least a part of the processing of calculating the value of the error function $F_M(T)$ by a fixed-point arithmetic using the value of $F_{N+i}(T_0)/F_N(T_0)$ or the value obtained by multiplying the value of $F_{N+i}(T_0)/F_N(T_0)$ by a constant, the value of $F_{N+i}(T_0)/F_N(T_0)$ or the value obtained by multiplying the value of $F_{N+i}(T_0)/F_N(T_0)$ by a constant being written into the coefficient table.

9. The error function calculation device as defined in claim 7, wherein the coefficient table stores a value of $F_{M+n}(T_0)$ calculated for a predetermined $T_0$, and
wherein the calculation section reads the value of $F_{M+n}(T_0)$ from the coefficient table, and performs at least a part of the processing of calculating the value of the error function $F_M(T)$ by a fixed-point arithmetic using values of $F_{M+n-1}(T_0), \ldots,$ and $F_M(T_0)$ calculated by the following equation (3) and the value of $F_{M+n}(T_0)$ from the coefficient table $$F_{M-1}(T) = \frac{1}{2M-1}\{\exp(-T) + 2TF_M(T)\}. \quad (3)$$

* * * * *